(12) United States Patent
Ohara

(10) Patent No.: US 7,475,345 B2
(45) Date of Patent: Jan. 6, 2009

(54) PRINTING SYSTEM

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 291 days.

(21) Appl. No.: 10/643,220

(22) Filed: Aug. 19, 2003

(65) Prior Publication Data

US 2004/0212824 A1 Oct. 28, 2004

(30) Foreign Application Priority Data

Aug. 19, 2002 (JP) ............................. 2002-237809

(51) Int. Cl.
*G06F 17/00* (2006.01)
*G06F 17/20* (2006.01)

(52) U.S. Cl. ..................................... 715/273

(58) Field of Classification Search ................ 358/402, 358/403, 1.12, 1.15; 715/527, 273, 208
See application file for complete search history.

(56) References Cited

U.S. PATENT DOCUMENTS

| 5,058,037 | A | * | 10/1991 | Kageyama et al. | ......... 358/1.17 |
| 5,220,674 | A | * | 6/1993 | Morgan et al. | .............. 709/223 |
| 6,362,894 | B1 | * | 3/2002 | Shima | ........................ 358/1.15 |
| 6,466,328 | B1 | * | 10/2002 | Bradley et al. | ............. 358/1.15 |
| 6,778,289 | B1 | * | 8/2004 | Iwata | ........................ 358/1.15 |
| 6,809,831 | B1 | * | 10/2004 | Minari | ....................... 358/1.15 |
| 6,862,597 | B2 | * | 3/2005 | Ogaki et al. | .................. 707/10 |
| 6,867,874 | B1 | * | 3/2005 | Shima | ........................ 358/1.15 |
| 7,092,117 | B2 | * | 8/2006 | Kageyama et al. | ......... 358/1.18 |
| 2002/0051163 | A1 | * | 5/2002 | Fujikura | ..................... 358/1.12 |
| 2002/0095352 | A1 | * | 7/2002 | Hitaka | .......................... 705/26 |

(Continued)

FOREIGN PATENT DOCUMENTS

CN 1364257 A 8/2002

(Continued)

OTHER PUBLICATIONS http://delivery.acm.org/10.1145/340000/338186/p147isaacson.pdf?key1=338186&key2=7318289211&coll=ACM&dl=ACM&CFID=58011846&CFTOKEN=40698995; Scott Isaacson, A Model For Internet Printing, Novell Inc, Dec. 1998, (pp. 147-156).*

(Continued)

*Primary Examiner*—Doug Hutton
*Assistant Examiner*—James J Debrow
(74) *Attorney, Agent, or Firm*—Oliff & Berridge, PLC

(57) ABSTRACT

A printing system including a server and a printer which can be communicate with the server. In such a system, the server is provided with a location data storage that stores location data of print data to be printed by the printer, and a data transmitting device that transmits the location data of the print data to the printer in response to a request of the location data received from the printer. While, the printer is provided with a location data requesting system that transmits a request for the location data to the server, a location data receiving system that receives the location data transmitted by the data transmitting device, and a printing device that obtains the print data from the location indicated by the location data received by the location data receiving system and prints out the obtained print data.

8 Claims, 14 Drawing Sheets

U.S. PATENT DOCUMENTS

| | | | |
|---|---|---|---|
| 2003/0002072 A1* | 1/2003 | Berkema et al. | 358/1.15 |
| 2003/0206311 A1* | 11/2003 | Konsella et al. | 358/1.14 |
| 2003/0231327 A1* | 12/2003 | Ashey et al. | 358/1.13 |
| 2005/0021608 A1* | 1/2005 | Wolff | 709/203 |
| 2005/0052679 A1* | 3/2005 | Green et al. | 358/1.14 |
| 2005/0068581 A1* | 3/2005 | Hull et al. | 358/1.16 |
| 2006/0203285 A1* | 9/2006 | Yamaguchi et al. | 358/1.15 |

FOREIGN PATENT DOCUMENTS

| | | |
|---|---|---|
| EP | 0 977 113 A2 | 2/2000 |
| JP | A-10-232880 | 9/1998 |
| JP | A-10-334120 | 12/1998 |
| JP | A 11-203100 | 7/1999 |
| JP | A-11-259486 | 9/1999 |
| JP | A 11-305904 | 11/1999 |
| JP | A-2000-132434 | 5/2000 |
| JP | A-2001-14353 | 1/2001 |
| JP | A-2001-268543 | 9/2001 |
| JP | A 2001-282604 | 10/2001 |
| JP | A-2001-297109 | 10/2001 |
| JP | A-2002-14996 | 1/2002 |
| JP | A-2002-36638 | 2/2002 |
| JP | A-2002-56028 | 2/2002 |

OTHER PUBLICATIONS

Michalek et al.; "Implementing and IPP Client and Server for Linux"; 1998; ACM;pp. 164-171.*

Wright, F.D., Requirments and Design Goals for an Internet Printing Protocol, 1998, ACM, pp. 172-179.*

Garfinkel, David, "Programmed Methods for Printer Graphical Output",ACM, 1962, pp. 477-479.*

Zebler, Peter,"Interoperability Testing for the Internet Printing Protocal", 1998, ACM, pp. 180-184.*

Navas et al.,"The Network is the Database", ACM, 2001, pp. 544-551.*

Medina et al,"Measuring the Evolution of Transport Protocola in the Internet", ACM, 2005, pp. 37-51.*

* cited by examiner

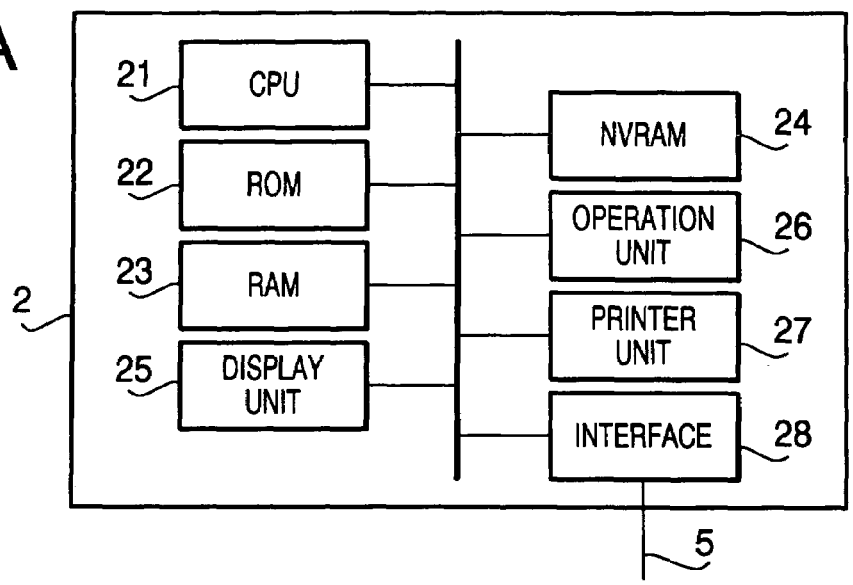
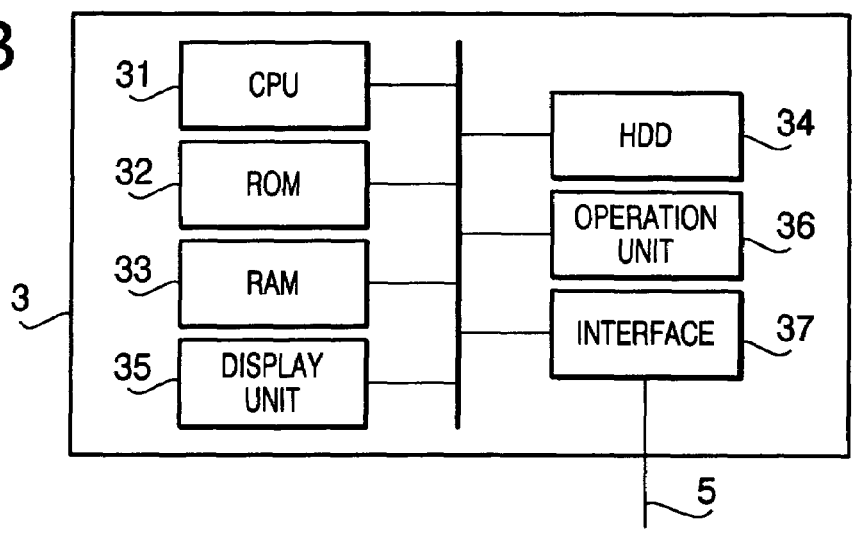
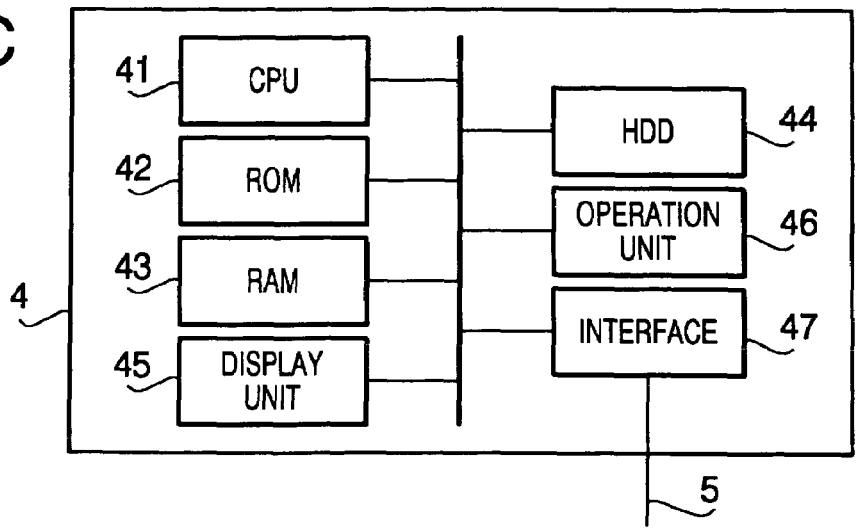

FIG. 7

>File1.ps
File3.pcl
File5.xml    ~25

FIG. 8 http://fileserver1.com/graph/File1.ps
http://fileserver1.com/doc/File2.doc
http://fileserver2.com/graph/File3.pcl
http://fileserver2.com/doc/File4.xls
http://fileserver3.com/contents/File5.xml File1.ps
File2.doc
File3.pcl
File4.xls
File5.xml

PRINTING SYSTEM

BACKGROUND OF THE INVENTION

The present invention relates to a printing system in which a printer obtains print data to be printed in accordance with location data and prints the obtained data.

Recently, a printing system as above has been suggested. An example of such a printing system is configured such that a printer is provided with a browser which is software for accessing a WWW (World Wide Web) server through a network. Typically, a memory of the printer in the printing system stores a plurality of URLs (Uniform Resource Locator) respectively designating a plurality of files. When a user prints one of such files, the user operates the printer to display the file names extracted from the URLs stored in the memory, and selects a desired one of the displayed file names. Then, the printer obtains the file using the HTTP (Hyper Text Transfer Protocol) in accordance with the URL corresponding to the file name selected by the user, and prints out the thus obtained file.

In such a printing system, there is a case where a plurality of printers are connected in a network. In such a case, it is necessary to register the URL information in each printer. If the URL information is updated, an administrator of the printing system should update the URL information of each printer. For example, if one file is added in the WWW server, the URL designating the newly added file is to be registered with the URL information in each printer. When there are a plurality of printers on the network, the administrator should register the URL with the URL information in each printer. Similarly, when some files are deleted from the WWW server, the corresponding URLs should be removed from the URL information contained in each of the plurality of printers. Although such updating jobs are very troublesome for the administrator, they have been indispensable as far as the URLs of the files are managed in the individual printers.

SUMMARY OF THE INVENTION

The present invention is advantageous in that a printing system in which the management of the data to be printed, in particular, the management of the URLs designating the files to be printed, can be done easily.

According to an aspect of the invention, there is provided a printing system including a server and a printer which can be communicate with the server. In such a system, the server is provided with a location data storage that stores location data of print data to be printed by the printer, and a data transmitting system that transmits the location data of the print data to the printer in response to a request of the location data received from the printer. While, the printer is provided with a location data requesting system that transmits a request for the location data to the server, a location data receiving system that receives the location data transmitted by the data transmitting system, and a printing device that obtains the print data from the location indicated by the location data received by the location data receiving system and prints out the obtained print data.

Optionally, the printing system may further include a location data updating system that updates the location data stored in the location data storage, the location data updating system being provided in at least one of the server, the printer and a device communicably connected with the server.

Further optionally, the printer may include a designating system operable to designate one of a plurality of locations, which are indicated by the location data, corresponding to the print data to be printed.

Still optionally, the location data storage stores location data of unprintable data which cannot be printed by the printer, and the transmitting system may transmit the location data of both the print data and the unprintable data. In this case, the designating system may designate a location represented by the location data of the print data.

In a particular case, the designating system may include an extracting system that extracts the location data of the print data from the location data received by the location data receiving system, and the designating system designates a location represented by the location data extracted by the extracting system.

Further optionally, the location data storage may store location data of unprintable data which cannot be printed by the printer, and the transmitting system may selectively transmit only the location data of the print data.

In a particular case, the transmitting system may include an extracting system that extracts the location data of the print data from the location data stored in the location data storage, the transmitting system transmitting the location data extracted by the extracting system.

According to another aspect of the invention, there is provided a printing system including a server and a printer which can be communicate with the server. Further, the server includes a data storage that stores print data to be printed by the printer, a location data generating system that generates location data of the print data based on the data stored in the data storage, and a data transmitting system that transmits the location data generated by the location data generating system to the printer in response to a request of the location data received from the printer. While, the printer includes a location data requesting system that transmits a request for the location data to the server, a location data receiving system that receives the location data transmitted by the data transmitting system, and a printing device that obtains the print data from the location indicated by the location data received by the location data receiving system and prints out the obtained print data.

Optionally, the printing system may be provided with a data updating system that updates the data stored in the data storage, the data updating system being provided in at least one of the server, the printer and a device communicably connected with the server. The updating system may add data into the data storage, or delete data from the data storage.

Optionally, the printer may include a designating system operable to designate one of a plurality of locations, which are indicated by the location data, corresponding to the print data to be printed.

Further optionally, the data storage may store unprintable data which cannot be printed by the printer, the location data generating system also generating location data of the unprintable data. In this case, the transmitting system transmits the location data of both the print data and the unprintable data. In such a case, the designating system may be configured to designate a location represented by the location data of the print data.

In a particular case, the designating system may include an extracting system that extracts the location data of the print data from the location data received by the location data receiving system, the designating system designates a location represented by the location data extracted by the extracting system.

Still optionally, the location data storage may store unprintable data which cannot be printed by the printer, the location data generating system also generating location data of the unprintable data, and the transmitting system selectively transmits only the location data of the print data.

In a particular case, the transmitting system may include an extracting system that extracts the location data of the print data from the location data stored in the location data storage, the transmitting system transmitting the location data extracted by the extracting system.

According to a further aspect of the invention, there is provided a printer communicable with a server. The printer may be provided with a location data requesting system that transmits a request for the location data to the server, a location data receiving system that receives the location data transmitted by the server, and a printing device that obtains the print data from the location indicated by the location data received by the location data receiving system and prints out the obtained print data.

According to a further aspect of the invention, there is provided a server communicably connected with a printer, which main include a location data storage that stores location data of print data to be printed by the printer, and a data transmitting device that transmits the location data of the print data to the printer in response to a request of the location data received from the printer.

According to a furthermore aspect of the invention, there is provided a server communicably connected with a printer, which may include a data storage that stores print data to be printed by the printer, a location data generating system that generates location data of the print data based on the data stored in the data storage, and a data transmitting device that transmits the location data generated by the location data generating system to the printer in response to a request of the location data received from the printer.

According to another aspect of the invention, there is provided a computer accessible recording medium storing a program to be executed by a computer, the computer operating, as it executes the program, to serve as the server of the above-described printing system.

Alternatively, the computer operates, as it executes the program in the recording medium, to serve as the printer of the above-described printing system.

BRIEF DESCRIPTION OF THE ACCOMPANYING DRAWINGS

FIG. 1 schematically shows a configuration of a network system to which embodiments of the present invention are applicable;

FIGS. 2A through 2C are block diagrams of a printer, a server and a personal computer connected to the network, which are shown in FIG. 1;

FIG. 7 shows an example of a list indicating printable files;

FIG. 8 shows a list of bookmarks indicating files to be printed;

DESCRIPTION OF THE EMBODIMENTS

Hereinafter, printing systems according to embodiments of the invention will be described with reference to the accompanying drawings.

Firstly, referring to FIGS. 1 and 2A-2C, a configuration of a network system 1 to which the printing systems according to the embodiments of the present invention is applicable will be described.

Figure 1:
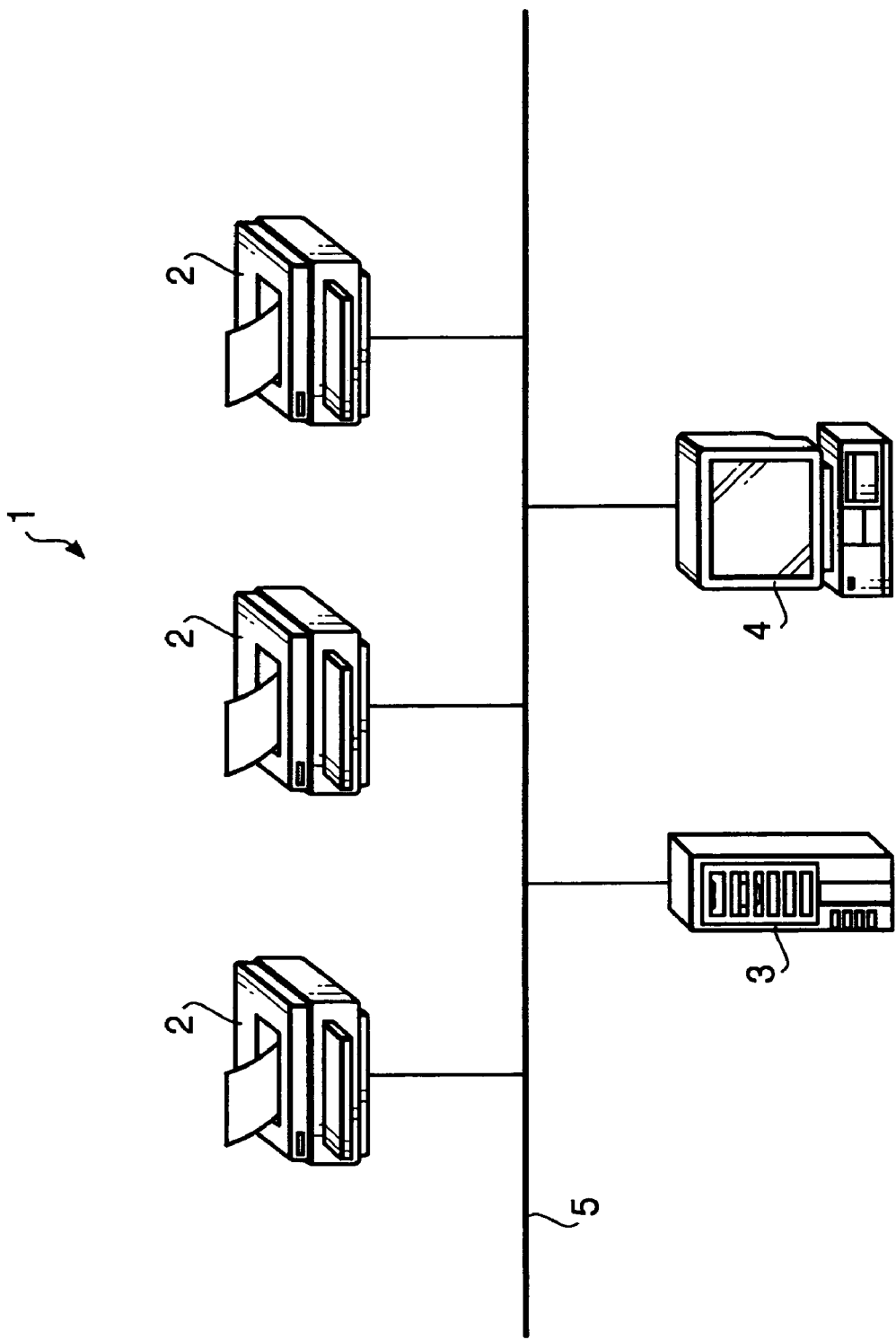

FIG. 1 shows an exemplary system configuration of a network system 1. The network system 1 shown in FIG. 1 includes three printers 2, a server 3 and a PC (personal computer) 4, which are connected to a LAN (local area network) 5. The printers 2, the server 3 and the PC 4 are communicably interconnected through the LAN 5. It should be noted that the configuration shown in FIG. 1 is an exemplary one, and the invention is not limited to this configuration.

FIG. 2A is a block diagram showing a configuration of one of the printers 2. As shown in FIG. 2A, the printer 2 includes a CPU (Central Processing Unit) 21, a ROM (Read Only Memory) 22, a RAM (Random Access Memory) 23, an NVRAM (Non-Volatile RAM) 24, a display unit 25, a printing unit 27 and an interface 28.

The CPU 21 executes various procedures and calculations. The procedures include a printing procedure (see FIGS. 3, 9, 11 and 15), a printable file extracting procedure (see FIG. 4), and a URL registering procedure (see FIG. 6).

The ROM 22 is a read-only storage, which constitutes a part of main memory of the printer 2. In the ROM 22, various programs including a system program to be executed by the CPU 21, and other programs corresponding to the above-described procedures to be executed by the CPU 21 are stored. The ROM 22 further stores display information (e.g., Web page data) to be displayed on a display unit 25 and/or a display unit 45 of the PC 4 connected with the printer 2 through the LAN 5.

The RAM 23 is a volatile readable and writable storage, and also functions as a part of the main memory of the printer 2. In the RAM 23, a work area is defined for storing intermediate operation results of data processing.

The NVRAM 24 is a non-volatile readable/writable storage, which retains the data stored therein even when it is powered off. The NVRAM 24 stores a URL which designates a bookmark that is a file containing at least one URL designating a file to be printed. The NVRAM 24 also stores a serial number of the printer 2.

The display unit 25 constitutes a display device of the printer 2 and includes, for example, an LCD (Liquid Crystal Display). On the display unit 25, a list of file names which are portions of URLs described in the bookmark and represent files the printer can directly print out, respectively. An example of the list of file names displayed on the display unit 25 is shown in FIG. 7. The LCD may be of a simple matrix type (e.g., STN type or DSTN type) or of an active matrix type such as a TFT type.

The operation panel 26 is an input device for the printer 2. The operation panel 26 includes a plurality of input keys and a touch panel layered on the display device of the display unit 25. By operating the operation panel 26, the user can designate one of the file names displayed as a list on the display unit 25, thereby the URL corresponding to the selected file name is designated.

The printing unit 27 provides a monochromatic or color printing function for printing letters, characters and/or images. In particular, the printing unit 27 prints out the contents of the file designated by the user under control of the CPU 21.

The interface 28 connects the printer 2 to the LAN 5 so as to enable the communication between the printer 2 and devices connected to the LAN 5, such as the server 3 and the PC 4. According to the first embodiment and its modification, through the interface 28, the printer 2 receives a bookmark (file name: bookmark.htm) from the server 3 (which will be described later), thereby the URLs indicated in the bookmark are received. According to the second embodiment and its modification, the printer receives a file (index.htm) which also contains URLs of files printable by the printer 2.

First Embodiment

Figure 6:
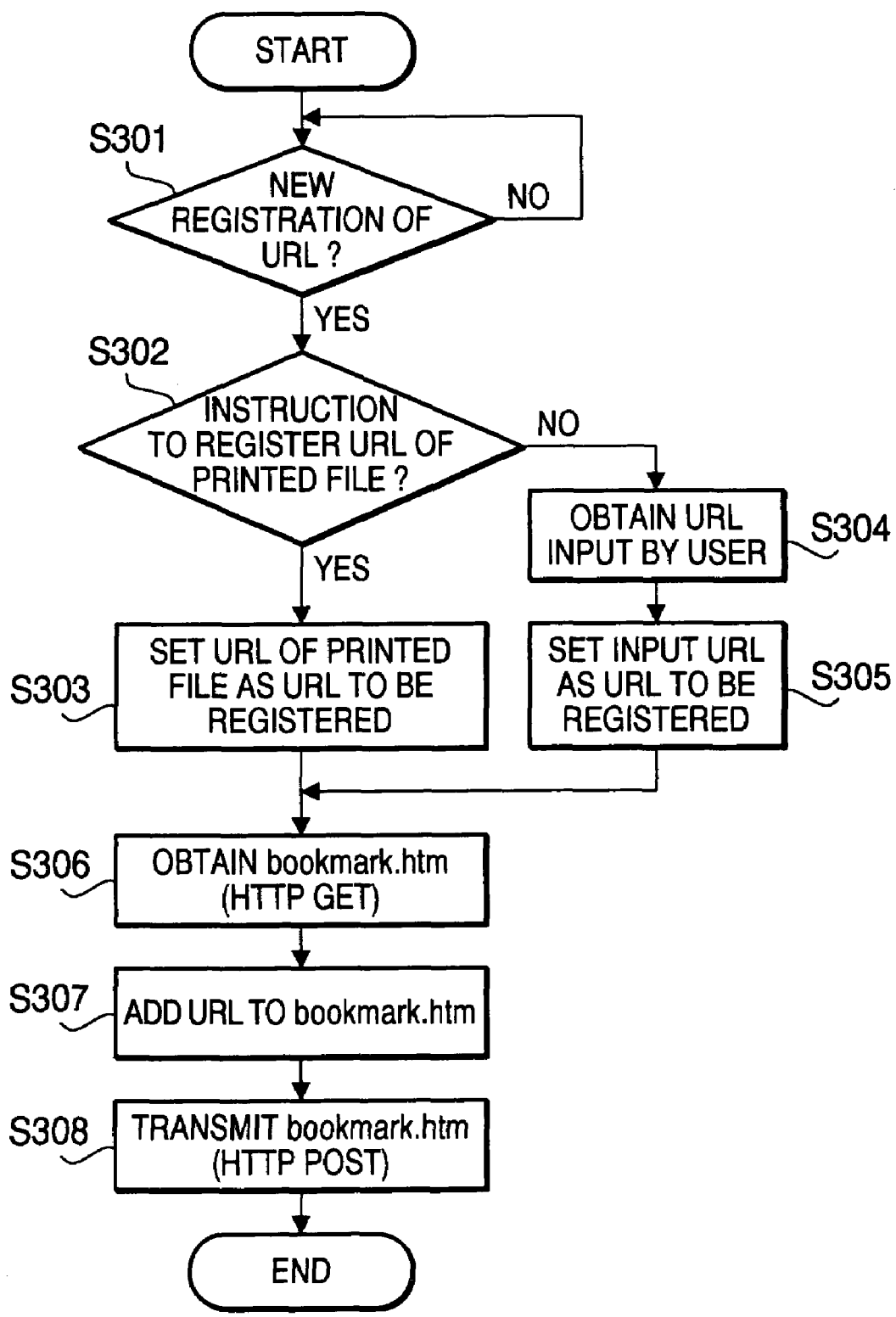
FIG. 6 is a flowchart illustrating a URL registering procedure executed by the printer according to the first embodiment.

As mentioned above, according to the first embodiment, the CPU 21 executes the printing procedure (see FIGS. 3 and 4) and the URL registering procedure (see FIG. 6).

In the printing procedure, when the user operates the operation unit 26 to instruct to display the list of the file names (the names of printable files), the CPU 21 requests the server 3 for transmission of the bookmark (i.e., the bookmark file: bookmark.htm) through the interface 28, in accordance with the URL stored in the NVRAM 24 and indicating the location of the bookmark, and then receives the bookmark file (i.e., bookmark.htm) through the interface 28 using GET request of HTTP (hereinafter, referred to as HTTP GET). Then, the CPU 21 extracts the URLs of the files which can be printed by the printer 2 from among the URLs indicated in the received bookmark file (bookmark.htm), and displays the list on the display unit 25. When the user operates the operation unit 26 to select on of the file names listed on the display unit 25, The CPU 21 obtains the selected file having the file name designated by the user based on the URL corresponding to the user-selected file name (HTTP GET). Then, the CPU 21 executes a process for printing out the contents on a recording medium.

In the URL registering procedure, when the user operates the operation unit 26 to start a new registration of a URL with the bookmark, the CPU 21 requests the server 3 for transmission of the bookmark file (i.e., bookmark.htm) through the interface 28 in accordance with the URL, which is stored in the NVRAM 24, indicating the location of the bookmark, and obtains the bookmark file (i.e., bookmark.htm) through the interface 28. Then, the CPU 21 adds the URL to be newly added to the bookmark file (i.e., bookmark.htm). After adding the new URL, the CPU 21 returns the updated bookmark file (i.e., bookmark.htm) to the server 3 through the interface 28 (HTTP POST). The server 3 overwrites the updated bookmark file (i.e., bookmark.htm) transmitted from the printer 2 on the old bookmark file (i.e., the server 3 updates the bookmark file).

The server 3 shown in FIG. 2B includes a CPU 31, a ROM 32, a RAM 33, an HDD (Hard Disk Drive) 34, a display unit 35, an operation unit 36 and an interface 37.

The CPU 31 executes various procedures and calculations. In particular, the CPU 31 executes a printing procedure (see FIGS. 5, 12 and 15) and an index.htm creating procedure (see FIGS. 13 and 16), which will be described in detail later.

The ROM 32 is a read-only storage, and constitutes a part of a main memory of the server 3. The ROM 32 stores a system program and various other programs, which includes programs for the aforementioned printing procedure and/or the intex.htm creating procedure, to be executed by the CPU 31. The RAM 33 is a readable/writable volatile memory, and also functions as a part of the main memory of the server 3. The RAM 33 includes a work area for storing intermediate calculation results of the data processing.

The HDD 34 is a readable/writable storage (a hard disk) and a drive therefor. The HDD 34 stores a bookmark file (i.e., bookmark.htm), which contains one or more URLs indicating locations of files (e.g., text files). An example of a list of the URLs in such a bookmark file is shown in FIG. 8. It should be noted that the bookmark file generally contains URLs of files which can be directly printed by the printer 2 and URLs of files which cannot be printed by the printer 2 directly.

The display unit 35 constitutes a display device of the server 3. The interface 37 connects the server 3 to the LAN 5 so as to enable the server 3 to communicate with the printers 2 and the PC 4 which are also connected to the LAN 5. As will be described in detail, the CPU 31 transmits the bookmark file (i.e., bookmark.htm) to the printer 2 through the interface 37, according to the first embodiment. According to the second embodiment, an index file (i.e., index.htm) is transmitted from the server 3 to the printer 2 through the interface 37.

As aforementioned, the CPU 31 executes the printing procedure and the URL registering procedure according to the first embodiment.

In the printing procedure, the CPU 31 receives the URL designating the location of a bookmark file (i.e., bookmark.htm) from the printer 2 through the interface 37, and then the CPU 31 transmits the bookmark file (bookmark.htm) stored in the HDD 34 to the printer 2, in accordance with the received URL, through the interface 37.

In the URL registering procedure, the CPU 31 receives the URL indicating the location of the bookmark file (i.e., bookmark.htm), and transmits the bookmark file stored in the HDD 34 to the printer 2, in accordance with the received URL, through the interface 37. Thereafter, when the CPU 31 receives the bookmark file (i.e., bookmark.htm) as updated from the printer 2, the CPU 31 updates the bookmark file (i.e., bookmark.htm) stored in the HDD 34 with the received bookmark file.

The PC 4 has, as shown in FIG. 2C, a CPU 41, a ROM 42, a RAM 43, an HDD 44, a display unit 45, an operation unit 46 and an interface 47.

The CPU 41 executes various processes and calculations. The ROM 42 is a read-only storage, which is a part of a main memory of the PC 4. The ROM 42 stores various programs such as a system program to be executed by the CPU 41. The RAM 43 is a readable/writable storage, and is also a part of the main memory of the PC 4. The RAM 43 includes a work area for storing an intermediate result of the data processing.

The HDD 44 includes a readable/writable storage (hard disk) and its drive. The display unit constitutes a display device of the PC 4. The operation unit 46 constitutes an input device of the PC 4. The interface 37 connects the PC 4 to the LAN 5 so as to enable the PC 4 to communicate with the printers 2 and the server 3, which are connected to the LAN 5.

Figure 3:
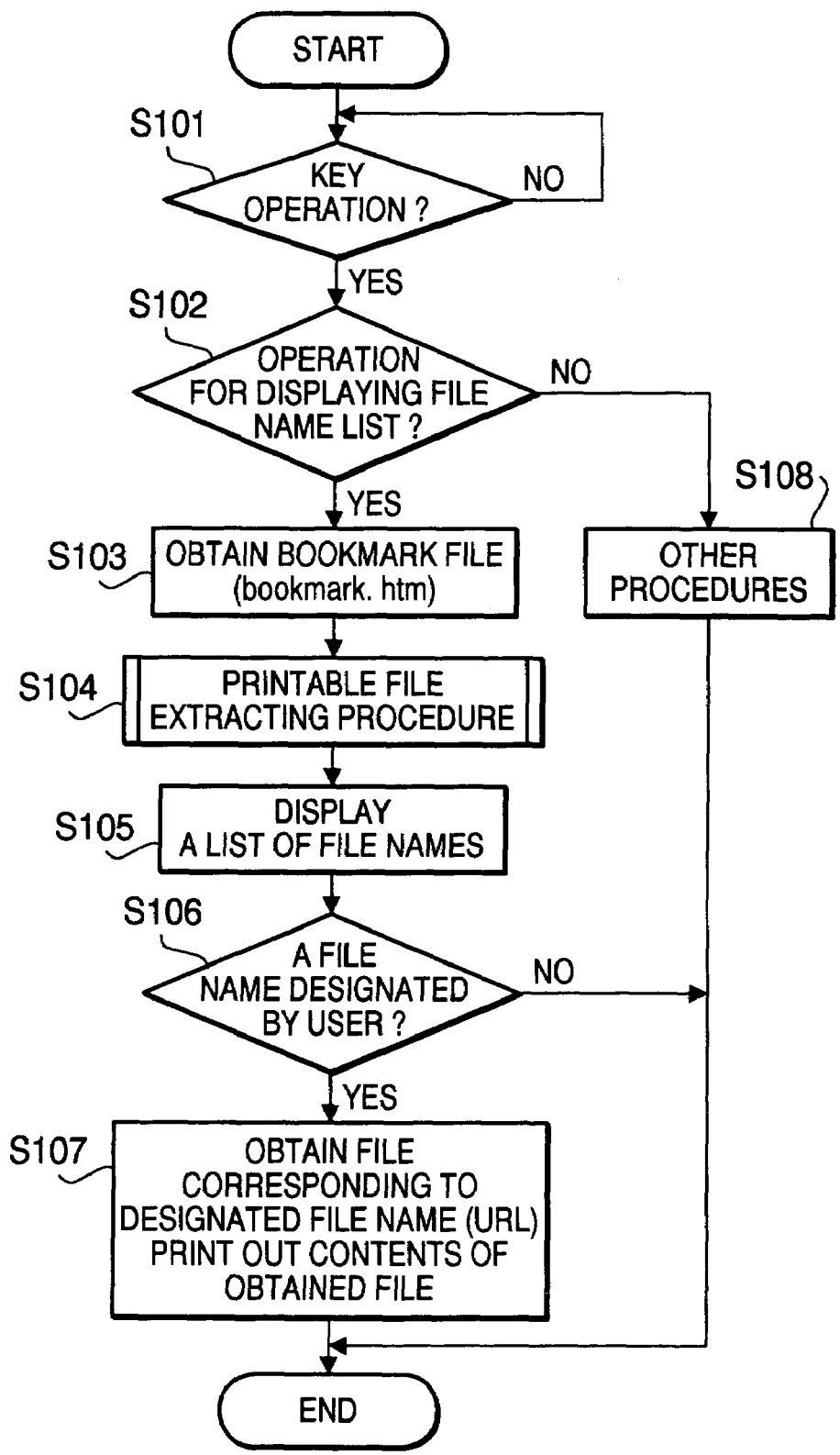
FIG. 3 is a flowchart illustrating a printing procedure executed in the printer according to a first embodiment.
Figure 4:
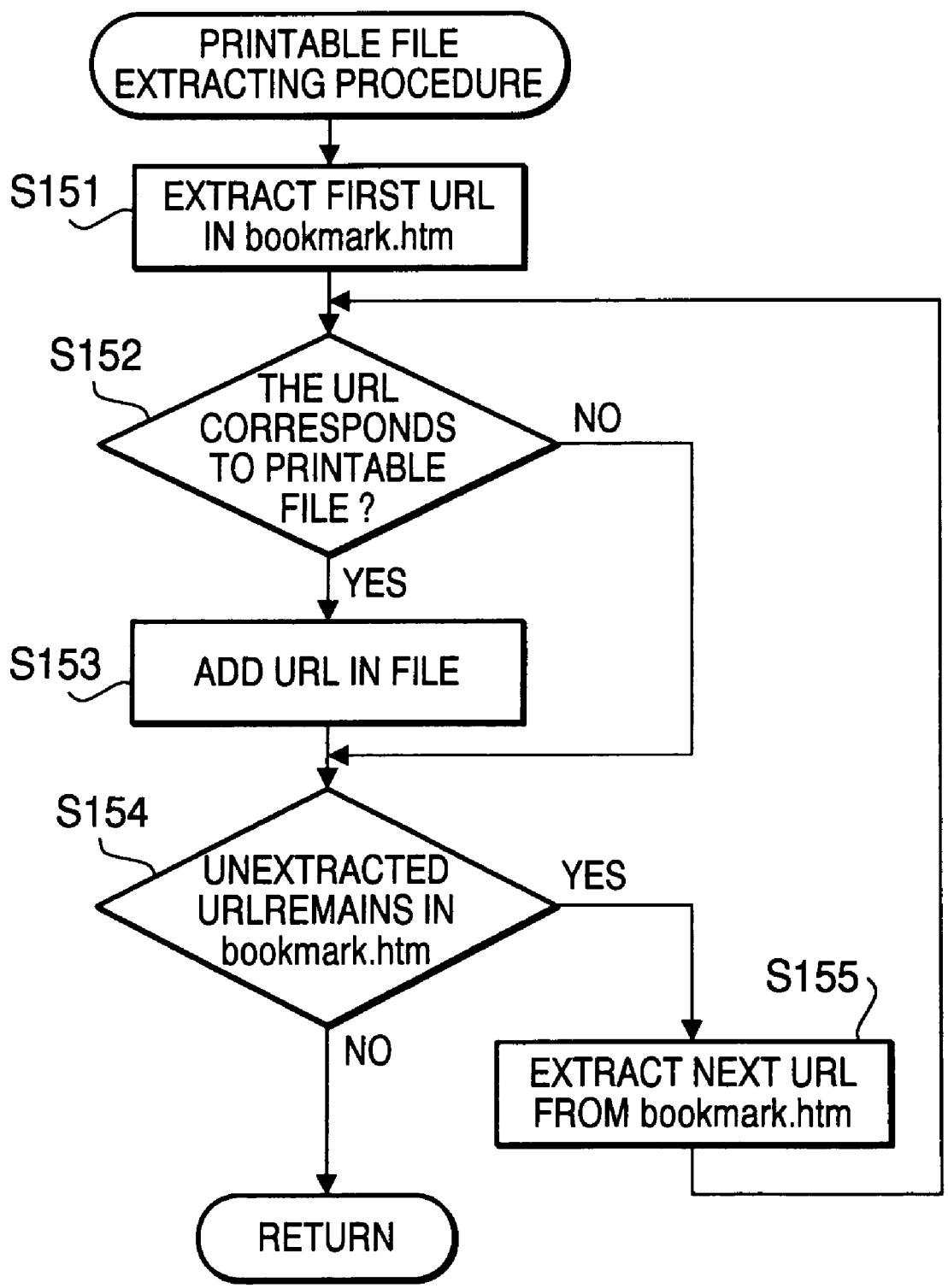
FIG. 4 is a flowchart illustrating a printable file extracting procedure executed in the printer according to the first embodiment.
Figure 5:
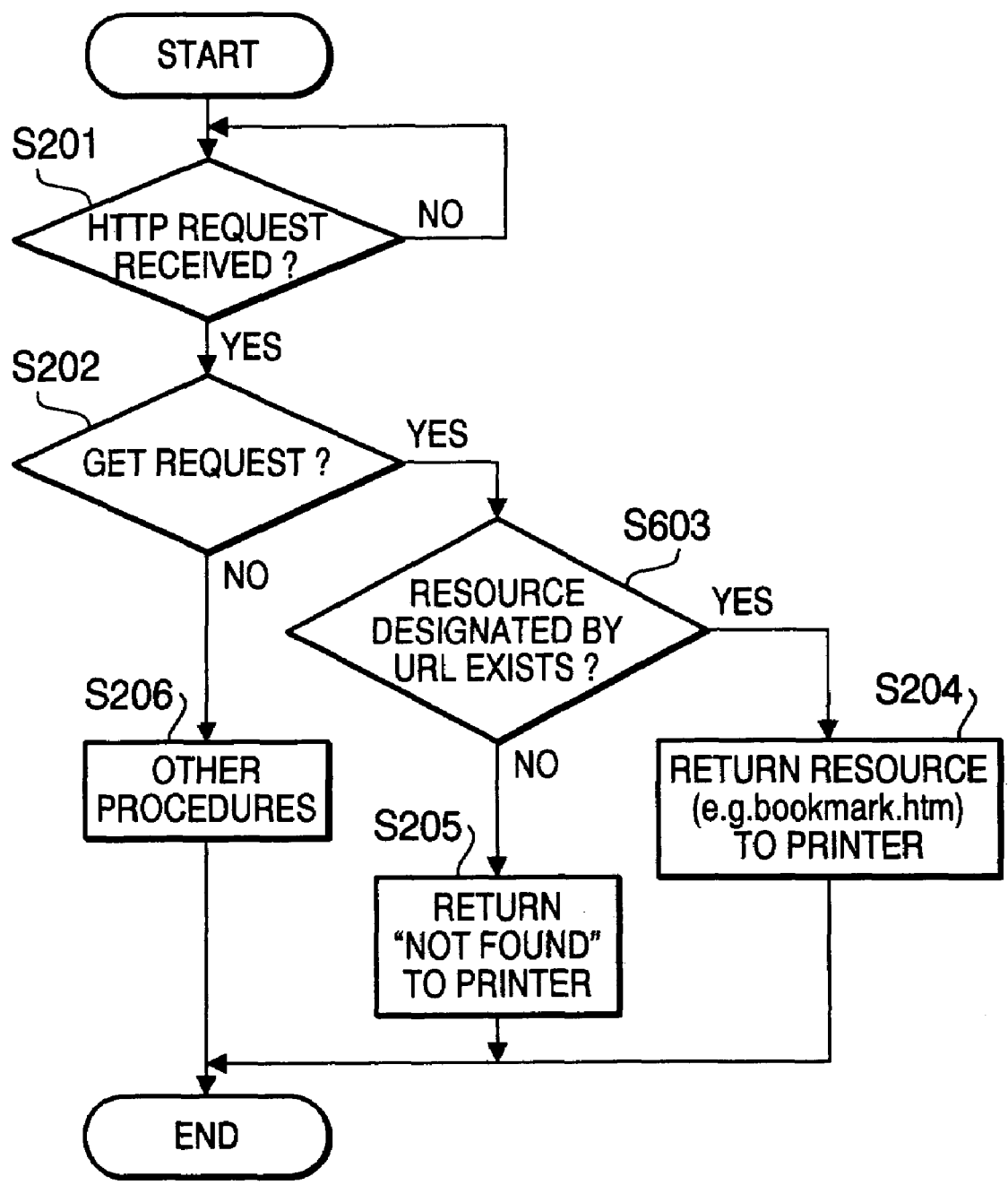
FIG. 5 is a flowchart illustrating a printing procedure executed in the server according to the first embodiment.

Hereinafter, operation of the network system 1 according to the first embodiment will be described with reference to FIGS. 3 through 5. FIG. 3 is a flowchart illustrating the printing procedure executed in the printer 2 and FIG. 4 is a flowchart illustrating a printable file extracting procedure executed in the printer 2. FIG. 5 is a flowchart illustrating a printing procedure executed in the server 3.

In S101 of FIG. 3, the CPU 21 of the printer 2 determines whether the user has performed a key operation using the operation unit 26. When the user has not operated the keys of the operation unit 26 (S101: NO), control returns to S101. When the user has operated the keys of the operation unit 26 (S101: YES), control proceeds to S102.

In S102, the CPU 21 determines whether the key operation by the user is related to display of the list of files. When the CPU 21 determines that the user's operation is not related to the display of the list of files (S102: NO), control proceeds to S108, where the CPU 21 executes a procedure corresponding to the key operation. Then, the procedure shown in FIG. 3 is finished.

When the CPU 21 determines that the user's operation is related to the display of the list of files (S102: YES), control proceeds to S103.

In S103, the CPU 21 transmits GET request of HTTP with a location (i.e., a path of the URL indicating the location) of the bookmark file (i.e., bookmark.htm), which URL is stored in the NVRAM 24, to the server 3 through the interface 28. Then, the CPU 21 receives the bookmark file (i.e., bookmark.htm) stored in the HDD 34 of the server from the server through the interface 28. With this communication, the CPU 21 (i.e., the printer 2) receives the URLs, which are indicated in the received bookmark file, stored in the HDD 34 of the server 3. Thereafter, control proceeds to S104.

In S104, an printable file extracting procedure is executed, which will be described later. It should be noted that, in the printable file extracting procedure, the CPU 21 extracts URLs of files which can be printed by the printer 2 from among the URLs indicated in the bookmark file (bookmark.htm) (see S154 of FIG. 4). After this procedure, control proceeds to S105.

In S105, the CPU 21 displays the file names which are parts of the URLs, based on the URLs extracted in the procedure in S104, on the display unit 25. With this operation, the list of file names as shown in FIG. 7 is displayed on the display unit 25. It should be noted that any one of the files indicated in the list can be printed by the printer 2. In the example shown in FIGS. 7 and 8, there are five URLs indicated in the bookmark file (i.e., bookmark.htm) as shown in FIG. 8, and in the printable file extracting procedure, three URLs (i.e., "http://fileserver1.com/graph/File1.ps", "http://fileserver2.com/graph/File3.pcl", and "http://fileserver3.com/contents/File5.xml") are extracted. Then, the file names "File1.ps", "File3.pcl" and "File5.xml" are displayed as a list on the display unit 25 as shown in FIG. 7. After displaying the file names on the display unit 25, control proceeds to S106.

In S106, the CPU 21 determines whether the user designate one of the file names displayed on the display unit 25 by operating the operation unit 26. When none of the listed files is designated by the user (e.g., when the user operates a cancel key or does not operate any key of the operation unit 26 for a predetermined period) (S106: NO), which means the user does not intend to print anyone of the listed file, and procedure shown in FIG. 3 is terminated. When the user designates one of the listed filed (S106: YES), control proceeds to S107. Since the file names indicated on the display unit 25 are those of files which can be printed by the printer 2, whichever file name may be designated, the file corresponding to the designated file name can be printed by the printer 2. Namely, it is ensured that the file the user can select using the operation unit 26 can be printed by the printer 2.

In S107, the CPU 21 obtains the file which is located at the URL corresponding to the file name designated by the user in S106 using GET request of HTTP (hereinafter, expressed as HTTP GET). Then, the contents of the thus obtained file is printed with the printing unit 27, and the procedure of FIG. 3 is finished. It should be noted that the file designated by the URL may be stored in the HDD 34 of the server, in another server not shown in FIG. 1, or at any other location which can be accessed by the printer 2 through the LAN 5.

Next, the printable file extracting procedure (S104 of FIG. 3) will be described in detail with reference to FIG. 4. In S151, the CPU 21 extracts the first URL indicated in the bookmark file (bookmark.htm). Then, in S152, the CPU 21 determines whether the file designated by the URL can be printed by the printer 2. When the CPU 21 determines that the file designated by the URL cannot be printed by the printer 2 (S152: NO), control proceeds to S154. When the CPU 21 determines that the file designated by the URL is printable by the printer 2 (S152: YES), control proceeds to S153. This decision is made based on the characters at the end of the URL. In this example, when the characters at the end of the URL are ".ps" or ".pcl", the file is determined as a printable file. Further, when the characters at the end of the URL are ".xml", if the file format is an "X-HTML, print format", then the file is determined as a printable file.

In S153, the CPU 21 writes the URLs of the files which are determined to be printable. Generally, the last part of a URL delimited with a slash "/" represents a file name. When the printable files are displayed on the display unit 25, the last part of each URL is displayed on the display unit 25, in this example.

In S154, the CPU 21 determines whether there exists a URL included in the bookmark file (bookmark.htm) but not yet examined in S152. When all the URLs in the bookmark file are extracted and examined (S154: NO), the procedure shown in FIG. 4 is finished. In this case, control proceeds to S105 of FIG. 3. When there exists a URL which has not yet been examined (S154: YES), an unexamined URL (which may be a URL written after the URL currently examined) is extracted in S155, and control returns to S152.

Next, the printing procedure executed in the server 3 will be described with reference to FIG. 5.

In S201, the CPU 31 of the server 3 determines whether an HTTP request is received from another device such as the printer 2. When the CPU 31 determines that the HTTP request has not been received (S201: NO), control returns to S201 to wait for reception of the HTTP request. When the CPU 31 determines that the HTTP request is received (S201: YES), control proceeds to S202.

In S202, the CPU 31 determines whether the HTTP request is a GET request. If the HTTP request is not the GET request (S202: NO), control proceeds to S206, where the CPU 31 executes a procedure corresponding to the received request. When the HTTP request is the GET request (S202: YES), control proceeds to S203.

In S203, the CPU 31 determines whether there exists a resource designated by the URL. When the CPU 31 determines that there is not a resource designated by the URL (S203: NO), control proceeds to S205, where the CPU 31 transmits a response indicating "NOT FOUNT" to the printer which transmits the GET request through the interface 37, and terminates the printing procedure. When the CPU 31 determines that there exists the resource as designated by the URL (S203: YES), control proceeds to S204, where the CPU 31 returns the resource designated by the URL and terminates the procedure of FIG. 5.

In the first embodiment, from the printer 2, the bookmark file (i.e., bookmark.htm) is requested using the GET request (S201: YES; S202: YES), and since the server 3 has the bookmark file as designated by the URL (S203: YES), the file bookmark.htm is transmitted to the printer 2 which issued the GET request (S204). With this operation, the URL(s) indicated in the bookmark file (bookmark.htm) is transmitted from the server 3 to the printer 2. The bookmark file (bookmark.htm) transmitted in S204 is received by the printer in S103 of FIG. 3.

Next, a URL registering procedure executed in the network system 1 will be described with reference to FIG. 6, which shows a flowchart illustrating the URL registering procedure executed by the printer 2.

In S301, the CPU 21 of the printer 2 determines whether the user performs a key operation using the operation unit 26 to newly register a URL. If a key operation to newly register the URL is not performed by the user (S301: NO), control returns to S301, and the key operation of the user is monitored. When the CPU 21 determines that the user performs the key operation related to the registration of the new URL (S301: YES), control proceeds to S302.

In S302, the CPU 21 determines whether the registration of the new URL is for registering a new URL of a printed file (which is not one of the files corresponding to the URLs indicated in the bookmark.htm). If the user's operation is for registering the new URL corresponding to the printer file (S302: YES), control proceeds to S303. When the user's operation is not for registering the new URL of the printed file (S302: NO), control proceeds to S304.

In S303, the CPU 21 regards the URL of the printed file as a URL to be registered with the bookmark file (bookmark.htm).

In S306, the CPU 21 transmits the path, which is stored in the NVRAM 24, of the URL indicating the location of the bookmark file (bookmark.htm) to the server 3 through the interface 28, and then receives the bookmark file (bookmark.htm) stored in the HDD 34 of the server 3 through the interface 28. Then, in S307, the CPU 21 add the URL to be newly registered in the bookmark file (bookmark.htm), and in S308, the CPU 21 transmits the bookmark file (bookmark.htm) as updated in S307 by adding the new URL to the server 3 (HTTP POST). The server 3 receives the updated bookmark file and replaces the bookmark file as stored in the HDD 34 with the updated bookmark file (bookmark.htm) which is received from the printer 2. With this operation, the bookmark file (bookmark.htm) stored in the HDD 34 is updated, and the new URL is registered with the bookmark file (bookmark.htm).

As described above, according to the first embodiment, the bookmark file containing the URLs of respective files is managed in the server 3, and in each printer 2, only the URL designating the bookmark stored in the server 3 is managed. The printer 2 requests, in accordance with the URL of the bookmark file, the server 3 for transmission of the bookmark file. Then, the server 3 returns the bookmark file in response to the request from the printer 2. Therefore, when one of more files are newly added or removed, only by updating the bookmark file (i.e., by adding or deleting URLs), the change can be reflected in each printer 2. Which reduce the administrators job significantly in contrast to the conventional printing system.

Further, even when a plurality of URLs corresponding to the printable files are indicated in the bookmark file transferred from the server to the printer, the user can select a desired file from among a list of file names. Accordingly, unnecessary printing jobs will not be executed, and only the necessary file can be printed. Furthermore, since the file names user can designate corresponds to the files printable by the printer, a wrong file which cannot be printed by the printer will not be selected by the user, and thus, an error regarding the selection of unprintable file can be prevented.

Still further, by executing the URL registration procedure shown in FIG. 6, a new URL designating a new file can easily be added to the bookmark from each printer 2.

Modification of First Embodiment

Next, a modification of the first embodiment will be described. In the modification, the extraction of the URLs of the files which can be printed by the printer 2 is executed in the server. In the following description, differences with respect to the above-described first embodiment will be mainly explained. The update of the bookmark stored in the HDD 34 of the server 3 is similar in this modification, and accordingly, it will not be explained hereafter.

In the ROM 22 of the printer 2, programs to be executed by the printer 2 are stored so that the printing procedure and the other procedures are performed. In the ROM 32 of the server, a program for the printing procedure (FIG. 10) and other programs are stored.

The CPU 21 of the printer 2 requests the server 3, in accordance with the URL stored in the NVRAM 24 and indicating the location of the bookmark file, for the transmission of the bookmark file (bookmark.htm) through the interface 28, when the user operates the operation unit 26 and instructs to display a list of the files (HTTP GET), and obtains the bookmark file (bookmark.htm) from the server 3 through the interface 28. Then, the CPU 21 displays a list of files which are parts of the URLs indicated in the bookmark file (bookmark.htm) as received. Further, when the user operates the operation unit 26 to select the file(s) to be printed from among the file names listed in the display unit 25, the CPU 21 obtains the file designated by the URL corresponding to the file name designated by the user through the interface 28 (HTTP GET). Then, the CPU 21 prints out the contents of the file as obtained using the printing unit 27.

When the server 3 receives the path of the URL designating the location of the bookmark file (bookmark.htm) from the printer 2 through the interface 37, the CPU 31 retrieves the bookmark file (bookmark.htm) based on the URL as received from the HDD 34. Then, the CPU extracts the URLs corresponding to the files which can be printed by the printer 2 from among the URLs indicated in the bookmark file (bookmark.htm). Then, the CPU 31 transmits a bookmark file (bookmark.htm) which contains the URLs as extracted to the printer 2 through the interface 37.

Hereinafter, the printing procedure performed in the network system 1, according to the modification of the first embodiment, will be described with reference to FIGS. 9 and 10.

Figure 9:
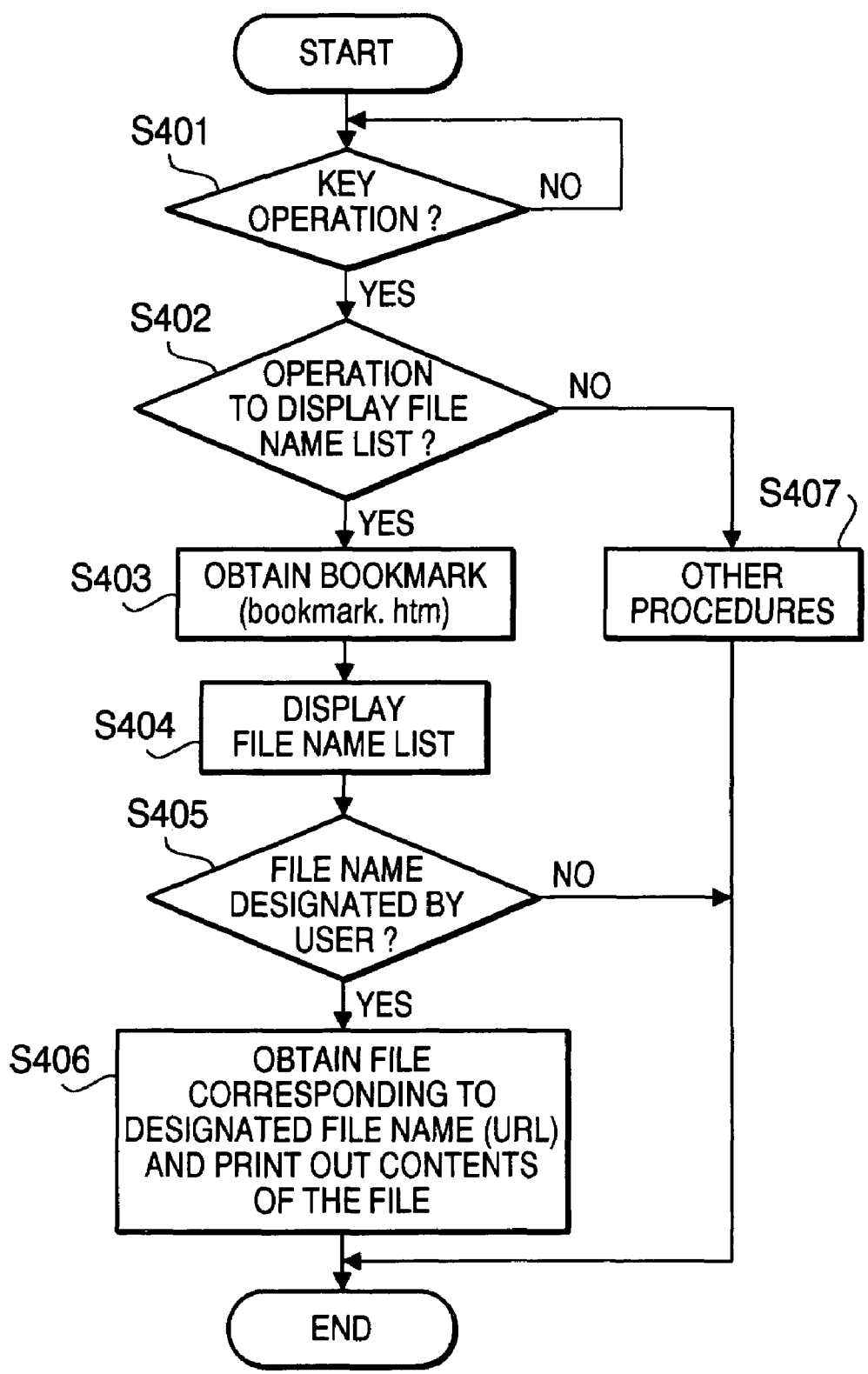
FIG. 9 is a flowchart illustrating a printing procedure executed by the printer according to a modification of the first embodiment.
Figure 10:
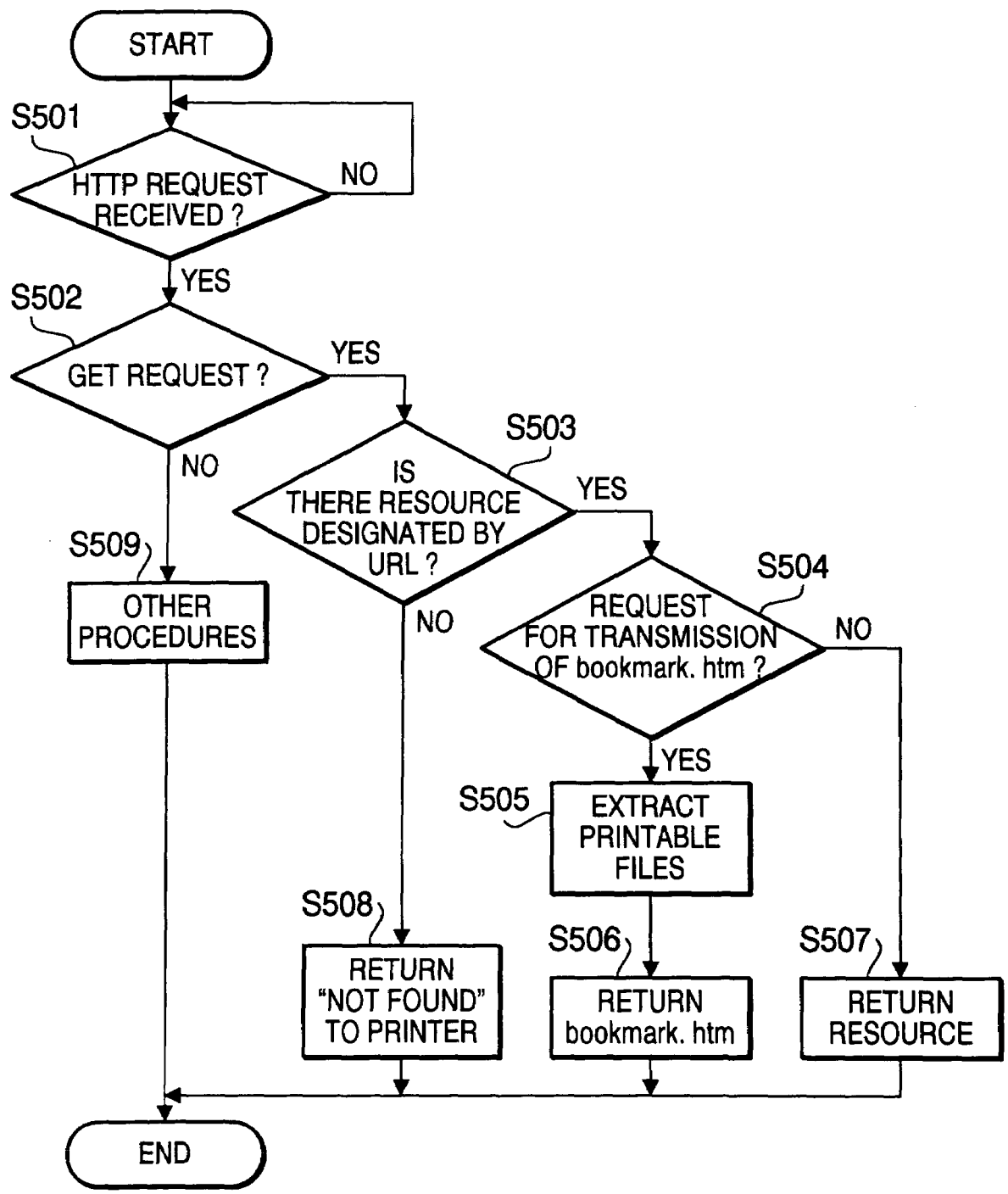
FIG. 10 is a flowchart illustrating a printing procedure executed by the server according to the modification of the fist embodiment.

FIG. 9 is a flowchart illustrating the printing procedure executed by the printer 2 according to the modification of the first embodiment, and FIG. 10 is a flowchart illustrating a printing procedure executed by the server 3 according to the modification of the first embodiment.

In FIG. 9, the CPU 21 of the printer 2 determines whether the user operates keys of the operation unit 26 in S401. When the user has not operated the keys of the operation unit 26 (S401: NO), control repeats S401 to monitor the key operation by the user. When the user operates the keys of the operation unit 26 (S401: YES), control proceeds to S402.

In S402, the CPU 21 determines whether the key operation by the user is related to display of the list of the file names. When the operation is not related to the display of the file names (S402: NO), the CPU executes a procedure corresponding to the key operation (S402), and terminates the procedure shown in FIG. 9. When the operation is related to the display of the list of the file names (S402: YES), control proceeds to S403.

In S403, the CPU 21 transmits GET request of HTTP with a path, which is stored in the NVRAM 24, of the URL designating the bookmark file (bookmark.htm) to the server 3 through the interface 28, and receives the bookmark file (bookmark.htm) from the server 3 through the interface 38 (see S506 of FIG. 10). With this procedure, the printer 2 receives the URLs (indicated in the bookmark file stored in the HDD 34) of the files which can be printed by the printer 2. Thereafter, control proceeds to S404.

In S404, the CPU 21 displays file names which are parts of the URLs indicated in the bookmark file (bookmark.htm) received from the server 3 in S403 (see FIG. 7). Then, control proceeds to S405.

In S405, the CPU 21 determines whether the user designate one of the file names displayed on the display unit 25 by operating the operation unit 26. When none of the listed files is designated by the user (e.g., when the user operates a cancel key or does not operate any key of the operation unit 26 for a predetermined period) (S405: NO), which means the user does not intend to anyone of the listed file and procedure shown in FIG. 9 is terminated. When the user designates one of the listed filed (S405: YES), control proceeds to S406. Since the file names indicated on the display unit 25 are those of files which can be printed by the printer 2, whichever file name may be designated, the file can be printed by the printer 2. Namely, it is ensured that the file the user can select using the operation unit 26 can be printed by the printer 2.

In S406, the CPU 21 obtains the file which is located at the URL corresponding to the file name designated by the user in S405 (HTTP GET). Then, the contents of the thus obtained file is printed with the printing unit 27, and the procedure of FIG. 9 is finished.

Next, the printing procedure, according to the modification of the first embodiment, which is executed in the server 3 will be described with reference to FIG. 10.

In S501, the CPU 31 of the server 3 determines whether an HTTP request is received from another device such as the printer 2. When the CPU 31 determines that the HTTP request has not been received (S501: NO), control returns to S501 to wait for reception of the HTTP request. When the CPU 31 determines that the HTTP request is received (S501: YES), control proceeds to S502.

In S502, the CPU 31 determines whether the HTTP request is a GET request. If the HTTP request is not the GET request (S502: NO), control proceeds to S509, where the CPU 31 executes a procedure corresponding to the received request. When the HTTP request is the GET request (S502: YES), control proceeds to S503.

In S503, the CPU 31 determines whether there exists a resource designated by the URL. When the CPU 31 determines that there is not a resource designated by the URL (S503: NO), control proceeds to S508, where the CPU 31 transmits a response indicating "NOT FOUNT" to the printer 2 which transmits the GET request through the interface 37, and terminates the printing procedure. When the CPU 31 determines that there exists the resource as designated by the URL (S503: YES), control proceeds to S504, where the CPU 31 determines whether the GET request it a request for transmission of the bookmark file (bookmark.htm).

When the request is not for the transmission of the bookmark file (S504: NO), control proceeds to S507, where the CPU 31 returns the resource designated by the URL to the printer 2 which transmitted the request through the interface 37, and terminates the procedure shown in FIG. 10. When the GET request is the request for the transmission of the bookmark file (bookmark.htm) (S504: YES), control proceeds to S505.

In S505, the CPU 31 temporarily stores the bookmark file (bookmark.htm) in the RAM 33, and extracts the URLs corresponding to files which can be printed by the printer 2 from among the URLs stored in the HDD 34, and stores the thus extracted URLs in the bookmark file stored in the RAM 33. It should be noted that in this procedure the bookmark file stored in the HDD 34 will not be updated using the bookmark file temporarily stored in the RAM 33. In S506, the CPU 31 returns the bookmark file (bookmark.htm) that is temporarily stored in the RAM 33 to the printer which transmitted the GET request through the interface 37, and terminates the procedure of FIG. 10.

In the modification of the first embodiment, from the printer 2, the bookmark file (i.e., bookmark.htm) is requested using the GET request (S501: YES; S502: YES), and since the server 3 has the resource (i.e., the bookmark file) as designated by the URL (S503: YES; S504: YES), the file bookmark.htm which only contains the URLs of files that can be printed by the printer 2 is transmitted to the printer 2 which issued the GET request (S506). With this operation, the URLs corresponding to the printable files are extracted from among the URLs indicated in the bookmark file stored in the HDD 34, and transmitted from the server 3 to the printer 2. The bookmark file (bookmark.htm) transmitted in S506 is received by the printer 2 in S403 of FIG. 9.

According to the modification of the first embodiment, substantially the same effects as provided by the first embodiment can be obtained.

Second Embodiment

Next, the printing system according to the second embodiment will be described with reference to FIGS. 11 and 12. In the following description, differences with respect to the first embodiment are mainly provided.

In the ROM 22 of the printer 2, the program for a printing procedure (shown in FIG. 11) to be executed by the printer 2 and other necessary programs are stored. In the NVRAM 24, a URL designating an index (e.g., when the name of the host of the server 3 is Server3, and a directory accommodating files is /document, "http: //Server3/document/index" is an example of the index, which will be referred to as an index URL, hereinafter) is stored. Further, the ROM 32 of the server 3 stores programs for printing procedure (see FIG. 12), an index.htm creating procedure (see FIG. 13) and other procedures to be executed by the server 3. The HDD 34 has a directory accommodating files (including printable and unprintable files), an example of which is indicated in FIG. 14.

When the user operates the operation unit 26 to instruct to display the list of the file names (the names of printable files), the CPU 21 requests the server 3 for transmission of the index file (i.e., index.htm) through the interface 28, in accordance with the index URL which is stored in the NVRAM 24 and indicates the location of the index file, and then the CPU 21 receives the index file (i.e., index.htm) through the interface 28 (HTTP GET). Then, the CPU 21 executes a procedure for displaying a list of flies which are parts of the URLs indicated in the index file (index.htm), and displays the list on the display unit 25. When the user operates the operation unit 26 to select on of the file names listed on the display unit 25, The CPU 21 obtains the selected file having the file name designated by the user based on the URL corresponding to the user-selected file name from the server 3 through the interface 28 (HTTP GET). Then, the CPU 21 executes a process for printing out the contents of the obtained file on a recording medium.

When the server 3 receives the URL of which the last characters are "index.htm" (i.e., index URL) from the printer 2 through the interface 37, the CPU 31 create an empty file whose name is "index.htm" in the RAM 33, and extracts the files which can be printed by the printer 2 from among the files in the directory of the HDD 34. Then, the CPU 31 creates URLs based on the host name of the server 3 and directory. For example, when the index URL is "http://Server3/document/index.htm", the created URLs for the printable files may be:

"http://Server3/document/file1.ps";
"http://Server3/document/file3.pcl"; and
"http://Server3/document/file5.xml", (which will be referred to as document URLs hereinafter).

Then, the CPU 31 writes the thus generated document URLs in the index file (index.htm), thereby, the index file "index.htm" indicating the URLs corresponding to the files that can be printed by the printer 2 is created. The, the CPU 31 transmits the thus created index file (index.htm) to the printer 2 through the interface 37.

Next, the printing procedure, according to the second embodiment, performed in the printing system 1 will be described with reference to FIGS. 11 through 13.

Figure 11:
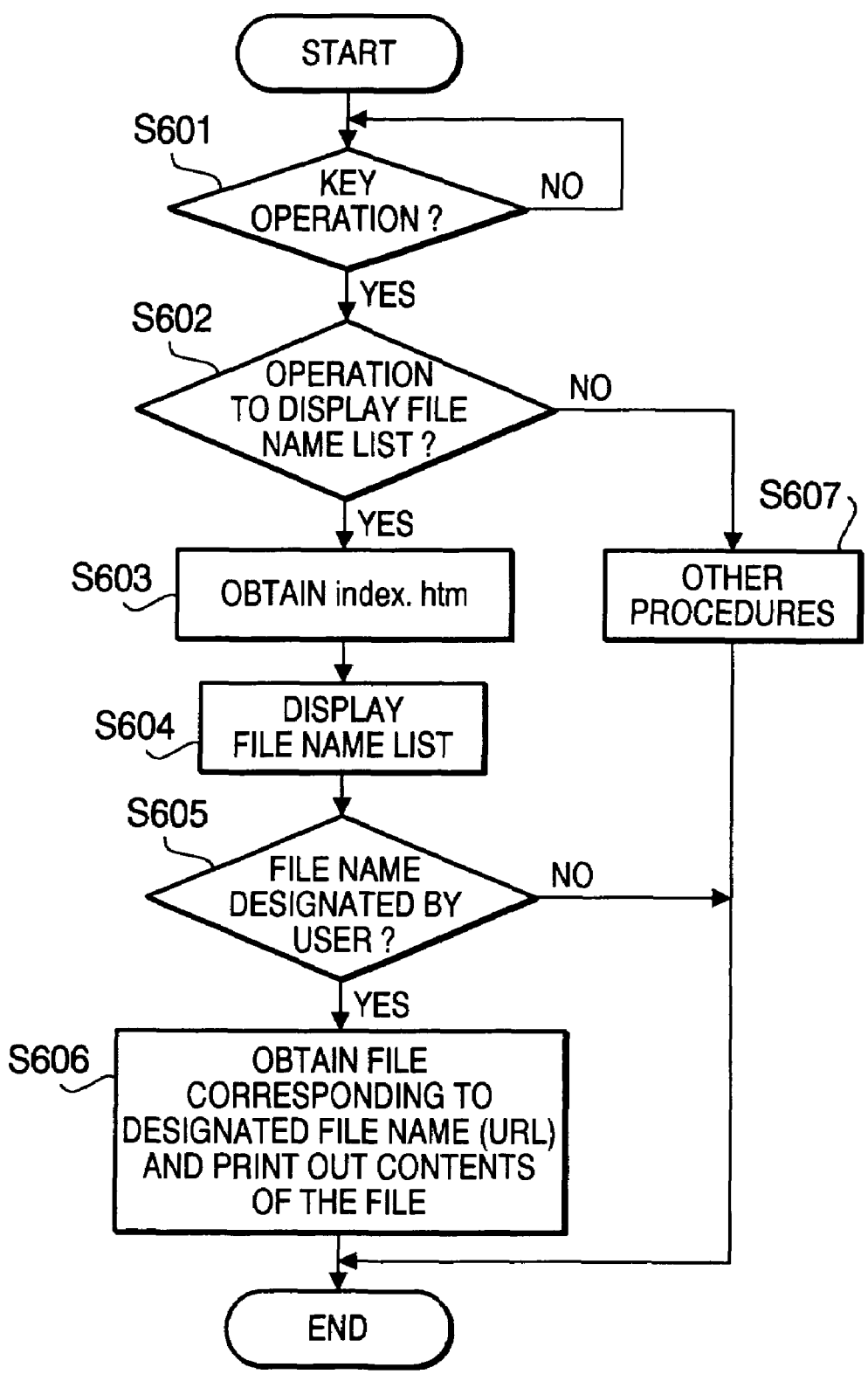
FIG. 11 is a flowchart illustrating a printing procedure executed by the printer according to a second embodiment.
Figure 12:
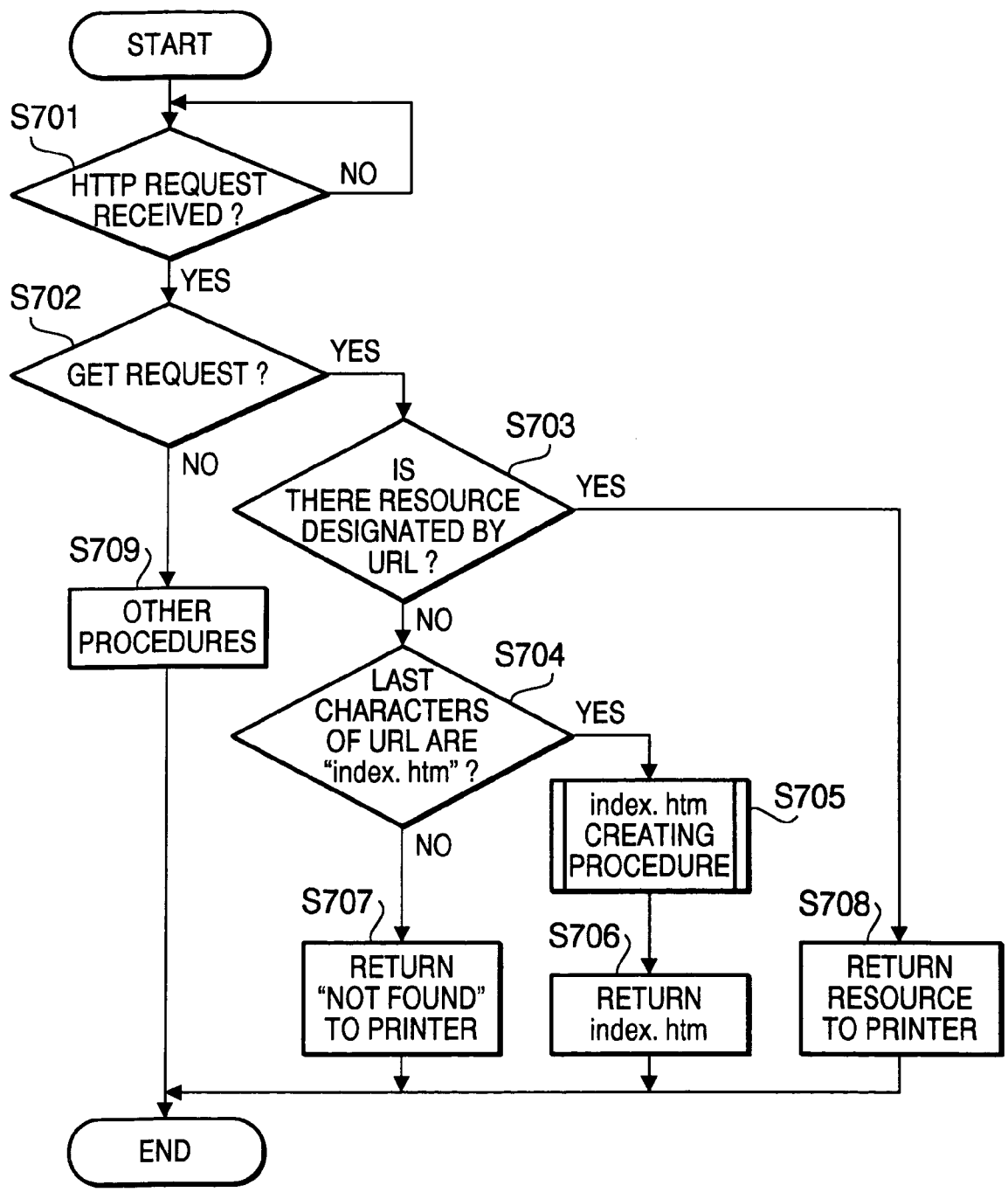
FIG. 12 is a flowchart illustrating a printing procedure executed by the server according to the second embodiment.
Figures 13, 14:
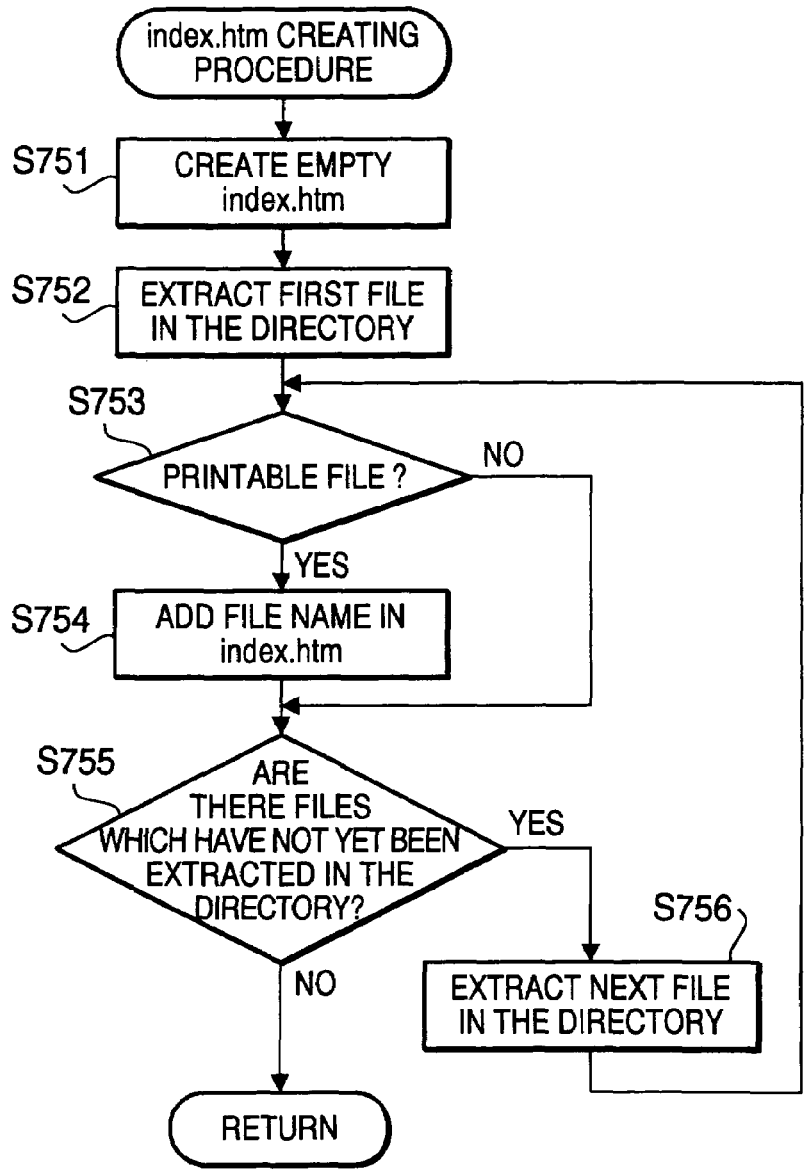
FIG. 13 is a flowchart illustrating an index.htm creating procedure executed by the server according to the second embodiment.
FIG. 14 shows an example of a list indicating files in a directory.

FIG. 11 is a flowchart illustrating the printing procedure executed by the printer 2 according to the second embodiment, and FIG. 12 is a flowchart illustrating a printing procedure executed by the server 3 according to the second embodiment. FIG. 13 is a flowchart illustrating the index.htm creating procedure executed by the server 3 according to the second embodiment.

In FIG. 11, the CPU 21 of the printer 2 determines whether the user operates keys of the operation unit 26 in S601. When the user has not operated the keys of the operation unit 26 (S601: NO), control repeats S601 to monitor the key operation by the user. When the user operates the keys of the operation unit 26 (S601: YES), control proceeds to S602.

In S602, the CPU 21 determines whether the key operation by the user is related to display of the list of the file names. When the operation is not related to the display of the file names (S602: NO), the CPU executes a procedure corresponding to the key operation (S607), and terminates the procedure shown in FIG. 11. When the operation is related to the display of the list of the file names (S602: YES), control proceeds to S603.

In S603, the CPU 21 transmits GET request of HTTP with the index URL stored in the NVRAM 24 to the server 3 through the interface 28, and receives the index file (index.htm) created in the server 3 through the interface 28 (see S705, 706 of FIG. 12, and FIG. 13). With this procedure, the printer 2 receives the URLs of the files which can be printed by the printer 2. Thereafter, control proceeds to S604.

In S604, the CPU 21 displays file names which are parts of the URLs indicated in the index file (index.htm) received from the server 3 in S603. Since the index.htm only includes the URLs of the files that can be printed by the printer 2, the file names displayed on the display unit 25 are those of the files printable by the printer 2. Then, control proceeds to S605.

In S605, the CPU 21 determines whether the user designates one of the file names displayed on the display unit 25 by operating the operation unit 26. When none of the listed files is designated by the user (e.g., when the user operates a cancel key or does not operate any key of the operation unit 26 for a predetermined period) (S605: NO), which means the user does not intend to print anyone of the listed file and procedure shown in FIG. 11 is terminated. When the user designates one of the listed filed (S605: YES), control proceeds to S606. Since the file names indicated on the display unit 25 are those of files which can be printed by the printer 2, whichever file name may be designated, the file can be printed by the printer 2. Namely, it is ensured that the file the user can select using the operation unit 26 can be printed by the printer 2.

In S606, the CPU 21 obtains the file which is located at the URL corresponding to the file name designated by the user in S605 (HTTP GET). Then, the contents of the thus obtained file is printed with the printing unit 27, and the procedure of FIG. 11 is finished.

Next, the printing procedure executed in the server 3 will be described with reference to FIG. 12.

In S701, the CPU 31 of the server 3 determines whether an HTTP request is received from another device such as the printer 2. When the CPU 31 determines that the HTTP request has not been received (S701: NO), control returns to S201 to wait for reception of the HTTP request. When the CPU 31 determines that the HTTP request is received (S701: YES), control proceeds to S702.

In S702, the CPU 31 determines whether the HTTP request is a GET request. If the HTTP request is not the GET request (S702: NO), control proceeds to S709, where the CPU 31 executes a procedure corresponding to the received request. When the HTTP request is the GET request (S702: YES), control proceeds to S703.

In S703, the CPU 31 determines whether there exists a resource designated by the URL. When the CPU 31 determines that there exists the resource as designated by the URL (S703: YES), control proceeds to S708, where the CPU 31 returns the resource designated by the URL and terminates the procedure of FIG. 12. When the CPU 31 determines that there is not a resource designated by the URL (S703: NO), control proceeds to S704.

In S704, the CPU 31 determines whether the last characters of the URL are "index.htm" (i.e., whether the URL is the index URL). When the last characters of the URL are not "index.htm" (S704: NO), control proceeds to S707, where the CPU 31 transmits a response indicating "NOT FOUNT" to the printer 2 which transmits the GET request through the interface 37, and terminates the printing procedure. When the last characters of the URL are "index.htm" (S704: YES), control proceeds to S705.

In S705, the CPU 31 executes an index.htm creating procedure (FIG. 13) which will be described later. In the index.htm creating procedure, the file names of the files stored in the HDD 34 and are printable by the printer 2 are extracted, and the document URL is written in the index file (index.htm). Following S705, the CPU 31 returns the index file (index.htm) created in S705 to the printer 2 that transmitted the GET request through the interface 37, and terminates the procedure shown in FIG. 12. It should be stressed that only the URLs corresponding to the files that can be printed by the printer 2 are indicated in the index file (index.htm) returned to the printer 2.

In the second embodiment, when the index file (i.e., index.htm) is requested by the printer 2 using the GET request (S701: YES; S702: YES), since the server 3 does not have the resource designated by the URL (S703: NO) and the last characters of the URL area "index.htm" (S704: YES), the index file (index.htm) is created and returned to the printer 2 (S706). Thus, the document URLs corresponding to the files that are stored in the HDD 34 of the server 3 and can be printed by the printer 2 are transmitted form the server 3 to the printer 2. The index file (index.htm) transmitted in S706 is received by the printer 2 in S603 of FIG. 11.

Next, the index.htm creating procedure which is called in S705 of FIG. 12 will be described with reference to FIG. 13.

In S751, the CPU 31 creates an empty index file (index.htm), and stores the file in the RAM 33. In S752, the CPU 31 extracts the first file name of the files in the directory whose name is a part of the index URL transmitted from the printer 2, and control proceeds to S753.

In S753, the CPU 31 determines whether the file corresponding to the file name extracted in S752 or S756 can be printed by the printer 2. When the CPU 31 determines that the file is not printable by the printer 2 (S752: NO), control proceeds to S755. When the CPU 31 determines that the file is printable by the printer 2 (S752: YES), control proceeds to S754. It should be noted that the determination whether a file is printable by the printer is made similarly to the determination executed in S152 of FIG. 4.

In S754, the CPU 31 creates a URL of the file determined to be printable in S753 (i.e., the document URL) with reference to the host name of the server 3, a directory name of the file and the file name. Then, the CPU 31 writes the thus created document URL in the index file (index.htm). Then, control proceeds to S755.

In S755, the CPU 31 determines whether there exists a file which has not yet been examined in the directory. If there is no file which has not been extracted (i.e., when all the files in the directory have been examined) (S755: YES), control proceeds to S706 of FIG. 12. When there remains a file (files) which has not yet been examined (S755: YES), control proceeds to S756, where the CPU 31 extracts a file next to the currently examined file, and control returns to S753.

When five files as indicated in FIG. 14 exist in the directory of the server 3, three URLs:

"http://[host name of the server 3]/[directory name for the file]/File1.ps";

"http://[host name of the server 3]/[directory name for the file]/File3.pcl"; and "http://[host name of the server 3]/[directory name for the file]/File5.xml"

are written in the index file (index.htm).

As described above, according to the second embodiment, the server 4 manages data of each file to be printed by the printer 2, while the URLs containing the host name of the server and directory name for the file data (i.e., the index URL) are managed by the printer 2. The printer 2 requests, in accordance with the URL (index URL) of the file, the server 3 for transmission of the index file. Then, the server 3 creates the URLs of the files managed by the server 3 (i.e., the document URLs), and returns the index file containing the document URLs in response to the request from the printer 2. Therefore, when one of more files are newly added or removed, only by updating the files stored in the server 3, the update is reflected in the index file, which reduce the administrators job significantly in contrast to the conventional printing system.

Further, even when a plurality of files are stored in the HDD 34 of the server 3, it is ensured that the user can select one of the file names corresponding to the printable files. Accordingly, unnecessary printing jobs will not be executed, and only the necessary file can be printed. Furthermore, since the file names user can designate corresponds to the files printable by the printer, a wrong file which cannot be printed by the printer will not be selected by the user, and thus, an error regarding the selection of unprintable file can be prevented.

Modification of the Second Embodiment

Figure 15:
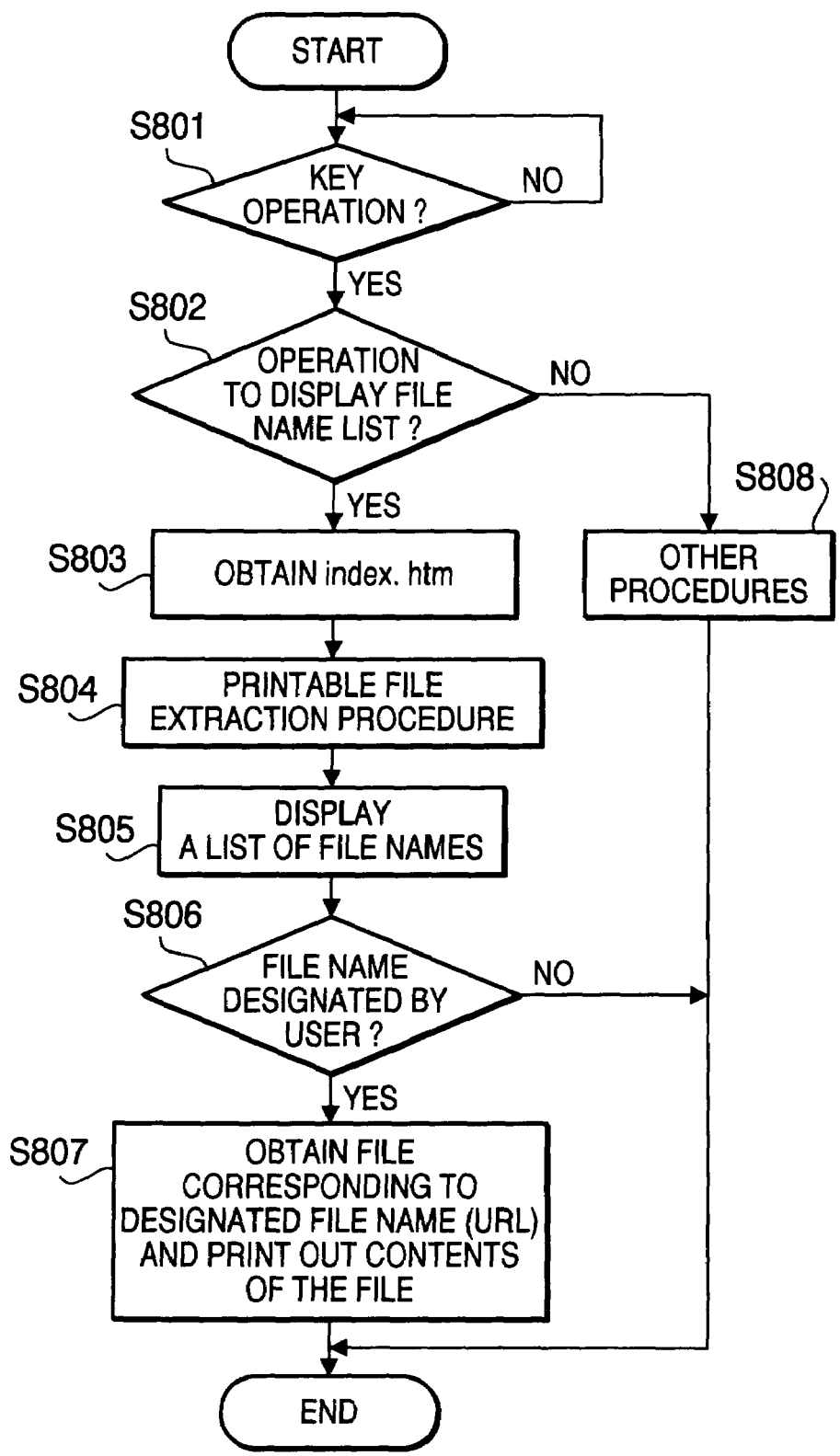
FIG. 15 is a flowchart illustrating a printing procedure executed by the printer according to a modification of the second embodiment.

Hereinafter, a modification of the second embodiment will be described with reference to FIGS. 12, 15 and 16. In the second embodiment, the extraction of the URLs corresponding to the files that can be printed by the printer 2 is executed in the server 3. In the modification of the second embodiment, the extraction of the URLs is executed in the printer 2. In the following description, the differences between the second embodiment and the modification thereof will be mainly explained.

In the ROM 22 of the printer 2, a program of the printing procedure (see FIG. 15) and other programs to be executed by the CPU 21 are stored. In the ROM 32 of the server, a program of the printing procedure (see FIGS. 12 and 16) and other programs to be executed by the CPU 31 of the server 3 are stored.

In the printing procedure, when the user operates the operation unit 26 to instruct to display the list of the file names (the names of printable files), the CPU 21 requests the server 3 for transmission of the index file (i.e., index.htm) through the interface 28, in accordance with the URL stored in the NVRAM 24 and indicating the location of the index file, and then receives the index file (i.e., index.htm) through the interface 28 (HTTP GET). Then, the CPU 21 extracts the URLs of the files which can be printer by the printer 2 from among the URLs indicated in the received index file (index.htm), and displays the list on the display unit 25. When the user operates the operation unit 26 to select on of the file names listed on the display unit 25, The CPU 21 obtains the selected file having the file name designated by the user based on the URL (i.e., the document URL) corresponding to the user-selected file name (HTTP GET). Then, the CPU 21 executes a process for printing out the contents of the obtained file on a recording medium.

When the server 3 receives a URL the last characters of which are "index.htm" (i.e., the index URL) from the printer 2 through the interface 37, the CPU 31 creates an empty file "index.htm". Then, the CPU 31 generates a URL (document URL) in accordance with names of files stored in the directory of the HDD 34, the name of the host 3, the name of the directory where the files are contained, and writes the thus generated URL in the index file (index.htm). The above operation is executed for all the files in the directory, thereby the index file (index.htm) containing the URLs corresponding to the files in the target directory is created. Then, the CPU 31 transmits the index file (index.htm) to the printer through the interface 37.

Firstly, FIG. 15 will be described. In FIG. 15, the CPU 21 of the printer 2 determines whether the user operates keys of the operation unit 26 in S801. When the user has not operated the keys of the operation unit 26 (S801: NO), control repeats S601 to monitor the key operation by the user. When the user operates the keys of the operation unit 26 (S801: YES), control proceeds to S802.

In S802, the CPU 21 determines whether the key operation by the user is related to display of the list of the file names. When the operation is not related to the display of the file names (S802: NO), the CPU executes a procedure corresponding to the key operation (S808), and terminates the procedure shown in FIG. 15. When the operation is related to the display of the list of the file names (S802: YES), control proceeds to S803.

Figure 16:
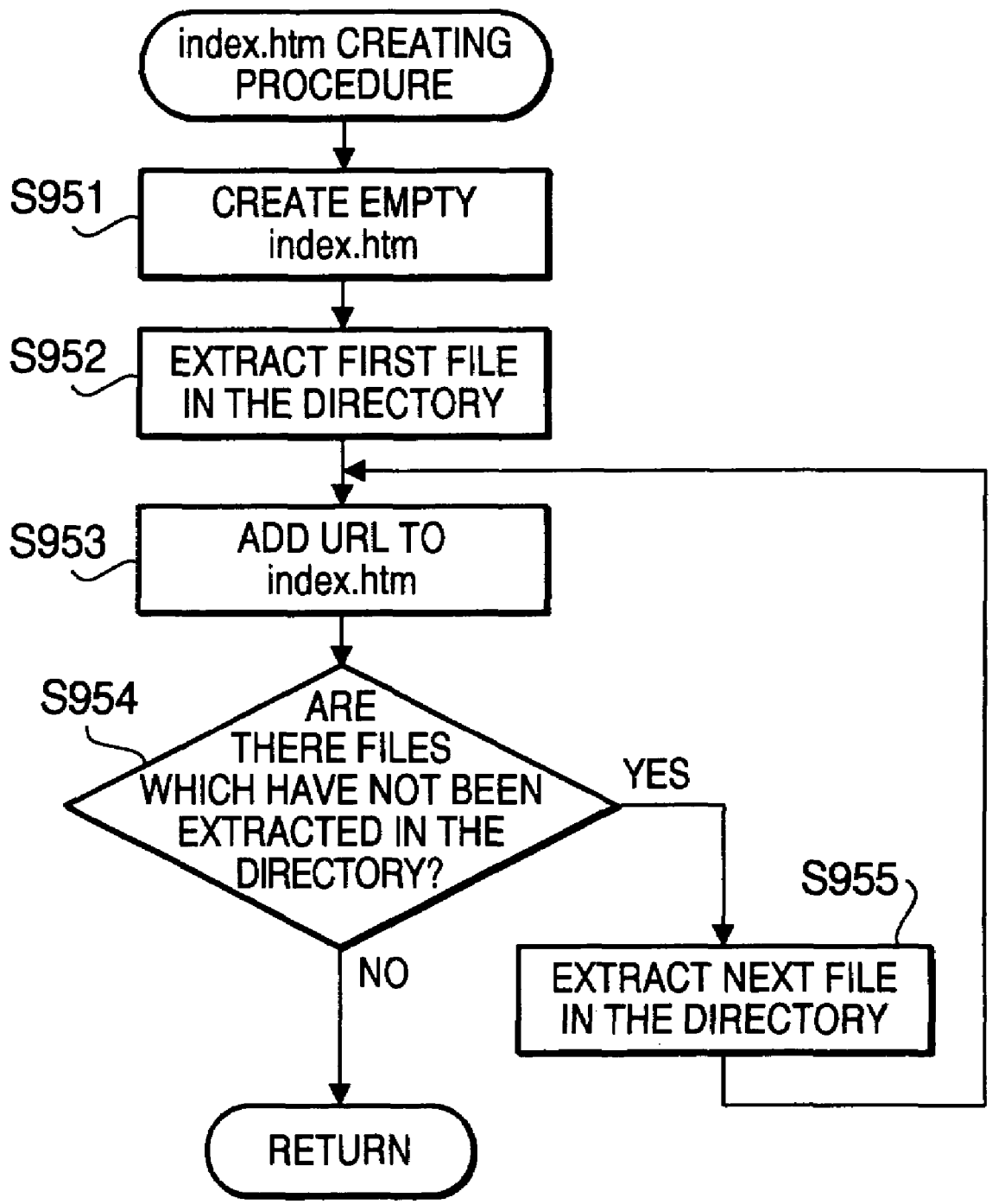
FIG. 16 is a flowchart illustrating a printing procedure executed by the server according to the modification of the second embodiment.

In S803, the CPU 21 transmits GET request of HTTP with the index URL stored in the NVRAM 24 to the server 3 through the interface 28, and receives the index file (index.htm) created in the server 3 through the interface 28 (see S705, 706 of FIG. 12, and FIG. 16). With this procedure, the printer 2 receives the URLs of the files which can be printed by the printer 2. Thereafter, control proceeds to S804.

In S804, the CPU 21 calls a printable file extracting procedure, in which the CPU 21 extracts file names of printable files from the URLs (document URLs) written in the index file (index.htm) obtained in S803.

In S805, the CPU 21 displays file names which are parts of the URLs (document URLs) on the display unit 25 based on the file names extracted in S804. It is stressed that the file names displayed on the display unit 25 are names of files that can be printed by the printer 2. Then, control proceeds to S806.

In S806, the CPU 21 determines whether the user designates one of the file names displayed on the display unit 25 by operating the operation unit 26. When none of the listed files is designated by the user (e.g., when the user operates a cancel key or does not operate any key of the operation unit 26 for a predetermined period) (S806: NO), which means the user does not intend to print anyone of the listed file and procedure shown in FIG. 15 is terminated. When the user designates one of the listed filed (S806: YES), control proceeds to S807. Since the file names displayed on the display unit 25 are those of files which can be printed by the printer 2, whichever file name may be designated, the file can be printed by the printer 2. Namely, it is ensured that the file the user can select using the operation unit 26 can be printed by the printer 2.

In S807, the CPU 21 obtains the file which is located at the URL (document URL) corresponding to the file name designated by the user in S806 (HTTP GET). Then, the contents of the thus obtained file is printed with the printing unit 27, and the procedure of FIG. 15 is finished.

According to the modification of the second embodiment, the server 3 executed the printing procedure similar to that shown in FIG. 12. Note that, in the second embodiment, the index file (index.htm) is created in the index file creating procedure (FIG. 13, S705), which includes only the URLs corresponding to the files that can be printed by the printer 2. In the modification of the second embodiment, since the index.htm creating procedure shown in FIG. 16 is executed in S705, the index file (index.htm) may include URLs corresponding to both printable files and unprintable files. In this modification, when the printer 2 requests for the index file (index.htm) using the GET request (S701: YES; S702: YES), the server 3 has no resource designated by the URL (S703: NO). Since the last characters of the URL are "index.htm" (S704: YES), the index file (index.htm) is created in the server 3, and transmitted to the printer (S706). With this procedure, the URLs corresponding to the files stored in the HDD 34 of the server 3 are transmitted from the server 3 to the printer 2 by means of the index file. The index file (index.htm) thus transmitted is received by the printer 2 in S803 of FIG. 15.

Next, the index.htm creating procedure according to the modification of the second embodiment will be described with reference to FIG. 16.

In S951, the CPU 31 creates an empty index file (index.htm), and stores the file in the RAM 33. In S952, the CPU 31 extracts the first file name of the files in the directory whose name is a part of the index URL transmitted from the printer 2, and control proceeds to S953.

In S953, the CPU 31 creates a URL of the file corresponding to the file name extracted in S952 or S955 with reference to the host name of the server 3, the name of the directory where the file is located and the file name. Then, the CPU 31 writes the thus created URL (document URL) in the index file (index.htm). Then, control proceeds to S954.

In S954, the CPU 31 determines whether there exists a file which has not yet been extracted in the directory. If there is no file which has not been extracted (i.e., when all the files in the directory have been extracted) (S954: YES), control proceeds to S706 of FIG. 12. When there remains a file (files) which has not yet been extracted (S954: YES), control proceeds to S955, where the CPU 31 extracts a file next to the currently examined file, and control returns to S953.

When five files as indicated in FIG. 14 exist in the directory of the server 3, five URLs:

"http://[host name of the server 3]/[directory name for the file]/File1.ps";

"http://[host name of the server 3]/[directory name for the file]/File2.doc";

"http://[host name of the server 3]/[directory name for the file]/File3.pcl";

"http://[host name of the server 3]/[directory name for the file]/File4.xls"; and "http://[host name of the server 3]/[directory name for the file]/File5.xml"

are written in the index file (index.htm).

According to the modification of the second embodiment, substantially the same effect as that of the second embodiment can be obtained.

It should be noted that the present invention need not be limited to the configurations of the above-described embodiments and modifications. Various modification can be made without departing from the scope of the invention.

In the first embodiment, the registration of a new URL with the bookmark stored in the HDD 34 is executed by the printer 2. However, the invention need not be limited to such a configuration, and the server 3 may be modified to directly register the new URL with the bookmark. Optionally, an external device, such as the PC 4, communicably connected with the server 3 may be user for registering the new URL with the bookmark. Further optionally, the system may be configured such that at least one of the printers 2, server 3 and PC 4 communicably connected to the server 3 is capable of deleting a URL registered in the bookmark.

In the second embodiment, the server 3 may be configured to directly add/delete files in the directory of the HDD 34. Optionally or alternatively, the printers 2 may add/delete files in the directory of the HDD 34 of the server 3. Further, an external device such as the PC 4 communicably connected with the server 3 may add/delete files in the directory of the HDD 34.

The systems, devices and methods as described above can be realized when appropriate programs provided and executed by a suitable electronic devices such as a personal computers. Such programs may be stored in recording medium such as a flexible disk, CD-ROM, memory cards and distributed in the form of the recording medium. Alternatively or optionally, such programs can be distributed through networks such as the Internet.

The present disclosure relates to the subject matter contained in Japanese Patent Application No. 2002-237809, filed on Aug. 19, 2002, which is expressly incorporated herein by reference in its entirety.

What is claimed is:

1. A printing system including a server and a printer which can be communicate with said server, wherein said server comprises:

a location data storage that stores a list of location data of both print data to be printed by said printer and unprintable data which cannot be printed by said printer;

a data transmitting system that transmits the list of location data of both the print data and the unprintable data to said printer in response to a specific request of the list of location data received from said printer, wherein said printer comprises:

a location data requesting system that transmits the specific request for the list of location data to said server;

a location data receiving system that receives the list of location data transmitted by said data transmitting system;

an extracting system that extracts the list of location data of the print data from the list of location data received by said location data receiving system;

a displaying system that displays the list of location data of only the print data extracted by said extracting system;

a designating system operable to designate one of a plurality of locations by a user operation, the plurality of locations being indicated by the list of location data of the print data displayed by said displaying system;

an obtaining system that obtains the print data from the location designated by said designating system; and a printing device that prints out the obtained print data obtained by said obtaining system.

2. The printing system according to claim 1, further comprising a location data updating system that updates the list of location data stored in said location data storage, said location data updating system being provided in at least one of said server, said printer and a device communicably connected with said server.

3. The printing system according to claim 1, wherein the list of location data comprises a list indicating storage locations of a plurality of pieces of print data.

4. The printing system according to claim 1, wherein the list of location data is document data different from the print data.

5. The printing system according to claim 1, wherein the location data requesting system transmits the request for the list of location data to the server when the printer receives an instruction to display the list of file names of the print data by a user operation.

6. A printing system including a server and a printer which can be communicate with said server, wherein said server comprises:

a data storage that stores both print data to be printed by said printer and unprintable data which cannot be printed by said printer;

a location data generating system that generates a list of location data of both the print data and the unprintable data based on the data stored in said data storage in response to a specific request for the list of location data received from said printer; and a data transmitting system that transmits the list of location data generated by said location data generating system to said printer in response to a specific request of the list of location data received from said printer, wherein said printer comprises:

a location data requesting system that transmits the specific request for the list of location data to said server;

a location data receiving system that receives the list of location data transmitted by said data transmitting system;

an extracting system that extracts the list of location data of the print data from the list of location data received by said location data receiving system;

a displaying system that displays the list of location data of only the print data extracted by said extracting system;

a designating system operable to designate one of a plurality of locations by a user operation, the plurality of locations being indicated by the list of location data of the print data displayed by said displaying system;

an obtaining system that obtains the print data from the location designated by said designating system; and a printing device that prints out the obtained print data obtained by said obtaining system.

7. A method of printing data with a server and a printer which can be communicate with said server with the server including a location data storage that stores a list of location data of both print data to be printed by said printer and unprintable data which cannot be printed by said printer, comprising:

transmitting a specific request for the list of location data to said server;

transmitting the list of location data of both the print data and the unprintable data to said printer in response to the specific request of the list of location data received from said printer, receiving the list of location data transmitted;

extracting the list of location data of the print data from the list of location data received;

displaying the list of location data of only the print data extracted;

designating one of a plurality of locations by a user operation, the plurality of locations being indicated by the list of location data of the print data displayed;

obtaining the print data from the location designated; and printing out the obtained print data obtained by said obtaining system.

8. A method of printing data with a server and a printer which can be communicate with said server, with the server including a data storage that stores both print data to be printed by said printer and unprintable data which cannot be printed by said printer, comprising:

transmitting a specific request for a list of location data to said server;

generating a list of location data of both the print data and the unprintable data based on the data stored in said data storage in response to the specific request for the list of location data received from said printer;

transmitting the list of location data generated to said printer in response to the specific request of the list of location data received from said printer;

receiving the list of location data transmitted;

extracting the list of location data of the print data from the list of location data received;

displaying the list of location data of only the print data extracted;

designating one of a plurality of locations by a user operation, the plurality of locations being indicated by the list of location data of the print data displayed;

obtaining the print data from the location designated; and printing out the obtained print data obtained.

* * * * *